United States Patent
Oya et al.

(10) Patent No.: US 11,214,129 B2
(45) Date of Patent: Jan. 4, 2022

(54) WINDSHIELD AND WINDSHIELD MANUFACTURING METHOD

(71) Applicant: NIPPON SHEET GLASS COMPANY, LIMITED, Tokyo (JP)

(72) Inventors: Kazuaki Oya, Tokyo (JP); Toyoyuki Teranishi, Tokyo (JP); Fumiyoshi Kondo, Tokyo (JP); Mitsuhiro Kawazu, Tokyo (JP); Kazutaka Kamitani, Tokyo (JP); Yohei Shimokawa, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 221 days.

(21) Appl. No.: 16/318,989

(22) PCT Filed: Jul. 14, 2017

(86) PCT No.: PCT/JP2017/025820
§ 371 (c)(1),
(2) Date: Jan. 18, 2019

(87) PCT Pub. No.: WO2018/016453
PCT Pub. Date: Jan. 25, 2018

(65) Prior Publication Data
US 2019/0315202 A1    Oct. 17, 2019

(30) Foreign Application Priority Data

Jul. 20, 2016    (JP) .............................. JP2016-142468

(51) Int. Cl.
*B32B 3/00*    (2006.01)
*B60J 1/00*    (2006.01)
*B32B 17/10*   (2006.01)
*B60J 1/02*    (2006.01)
(Continued)

(52) U.S. Cl.
CPC ......... *B60J 1/002* (2013.01); *B32B 17/10036* (2013.01); *B60J 1/02* (2013.01);
(Continued)

(58) Field of Classification Search
CPC ... B60J 1/002; B60J 1/02; B60R 11/04; B32B 7/12; B32B 17/10036; B32B 17/10761; B32B 2250/03
See application file for complete search history.

(56) References Cited

U.S. PATENT DOCUMENTS 8,416,375 B2 *  4/2013  Oki ..................... G02B 5/0816
                                                349/115
2004/0160688 A1  8/2004  Noguchi et al.
(Continued)

FOREIGN PATENT DOCUMENTS

CN    201283680 Y    8/2009
CN    102310617 A    1/2012
(Continued)

OTHER PUBLICATIONS

International Search Report (PCT/ISA/210) issued in PCT/JP2017/025820, dated Oct. 3, 2017.
(Continued)

*Primary Examiner* — Elizabeth E Mulvaney
(74) *Attorney, Agent, or Firm* — Birch, Stewart, Kolasch & Birch, LLP

(57) ABSTRACT

A windshield according to an aspect of the present invention is a windshield for an automobile on which an information acquisition device capable of acquiring information from the outside of a vehicle by emitting and/or receiving light can be arranged. The windshield includes; a glass plate including an information acquisition region that is opposite to the information acquisition device and through which the light passes; and an antifog laminate that includes a heat blocking
(Continued)

layer and an antifog layer with antifog properties layered on one surface of the heat blocking layer, and that is layered on a surface on a vehicle interior side of the information acquisition region while the other surface of the heat blocking layer faces the surface on the vehicle interior side of the information acquisition region.

38 Claims, 22 Drawing Sheets

(51) Int. Cl.
    *B60R 11/04* (2006.01)
    *C03C 17/36* (2006.01)
    *B60R 11/00* (2006.01)

(52) U.S. Cl.
    CPC .......... *B60R 11/04* (2013.01); *C03C 17/3681* (2013.01); *B32B 17/10761* (2013.01); *B32B 2250/03* (2013.01); *B60R 2011/0026* (2013.01)

(56) References Cited

U.S. PATENT DOCUMENTS

| | | |
|---|---|---|
| 2009/0239017 A1 | 9/2009 | Ishioka |
| 2012/0002125 A1 | 1/2012 | Oki |
| 2012/0119104 A1* | 5/2012 | Arslan .................. B60R 11/04 250/395 |
| 2017/0341491 A1 | 11/2017 | Nakagawa |

FOREIGN PATENT DOCUMENTS

| | | |
|---|---|---|
| CN | 102470802 A | 5/2012 |
| CN | 202703195 U | 1/2013 |
| CN | 104708875 A | 6/2015 |
| CN | 205368221 U | 7/2016 |
| JP | 8-67138 A | 3/1996 |
| JP | 2711857 B2 | 2/1998 |
| JP | 2003-73652 A | 3/2003 |
| JP | 2006-264458 A | 10/2006 |
| JP | 2007-177196 A | 7/2007 |
| JP | 2008-536732 A | 9/2008 |
| JP | 4442863 B2 | 3/2010 |
| JP | 2010-180068 A | 8/2010 |
| JP | 2013-500900 A | 1/2013 |
| JP | 2015-25107 A | 2/2015 |
| JP | 2015-87763 A | 5/2015 |
| JP | 2016-88493 A | 5/2016 |
| WO | WO 2008/069186 A1 | 6/2008 |

OTHER PUBLICATIONS

Written Opinion (PCT/ISA/237) issued in PCT/JP2017/025820, dated Oct. 3, 2017.
Japanese Office Action for Japanese Application No. 2018-528534, dated Feb. 2, 2021, with English translation.
Chinese Office Action and Search Report for Chinese Application No. 201780043555.6, dated Jun. 11, 2021, with English translation.

* cited by examiner

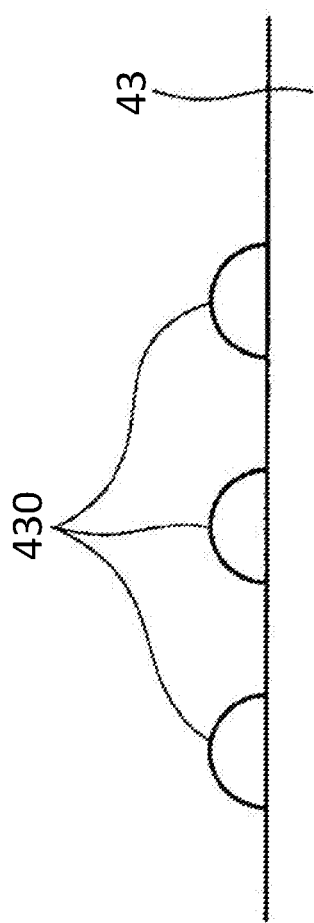

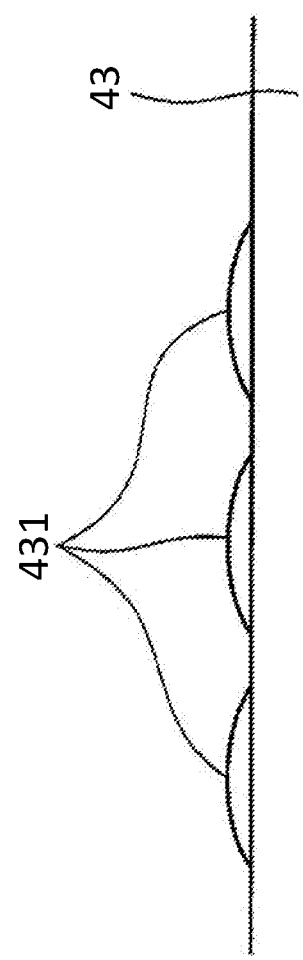

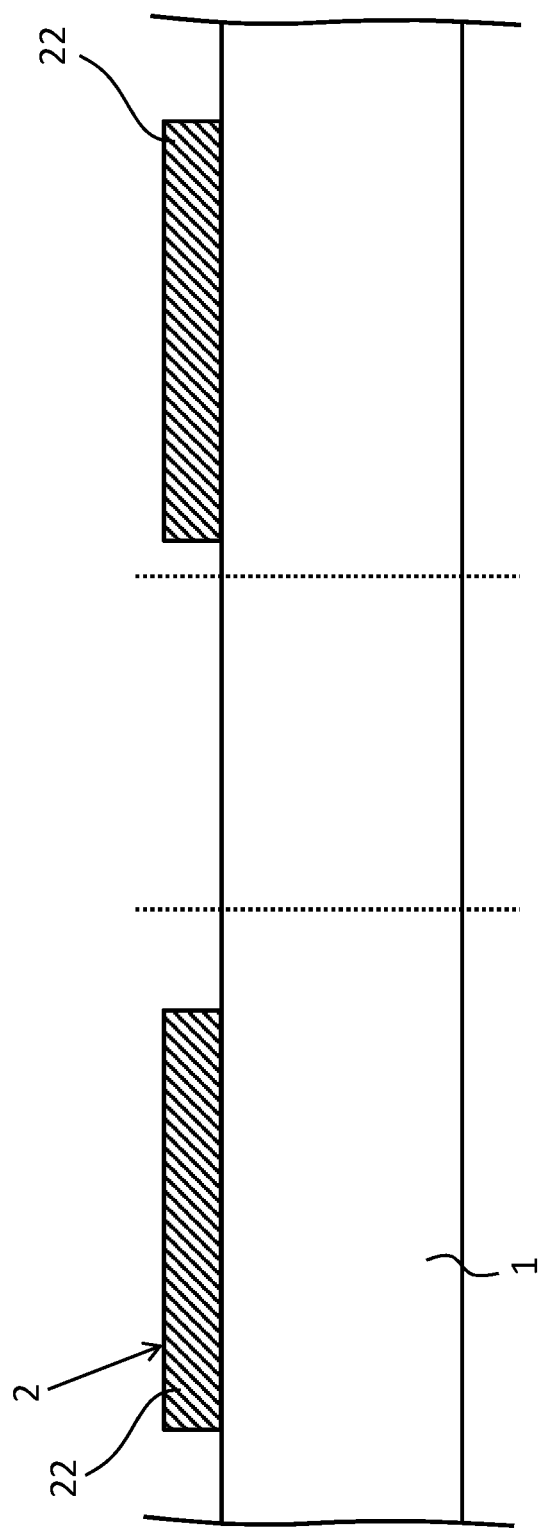

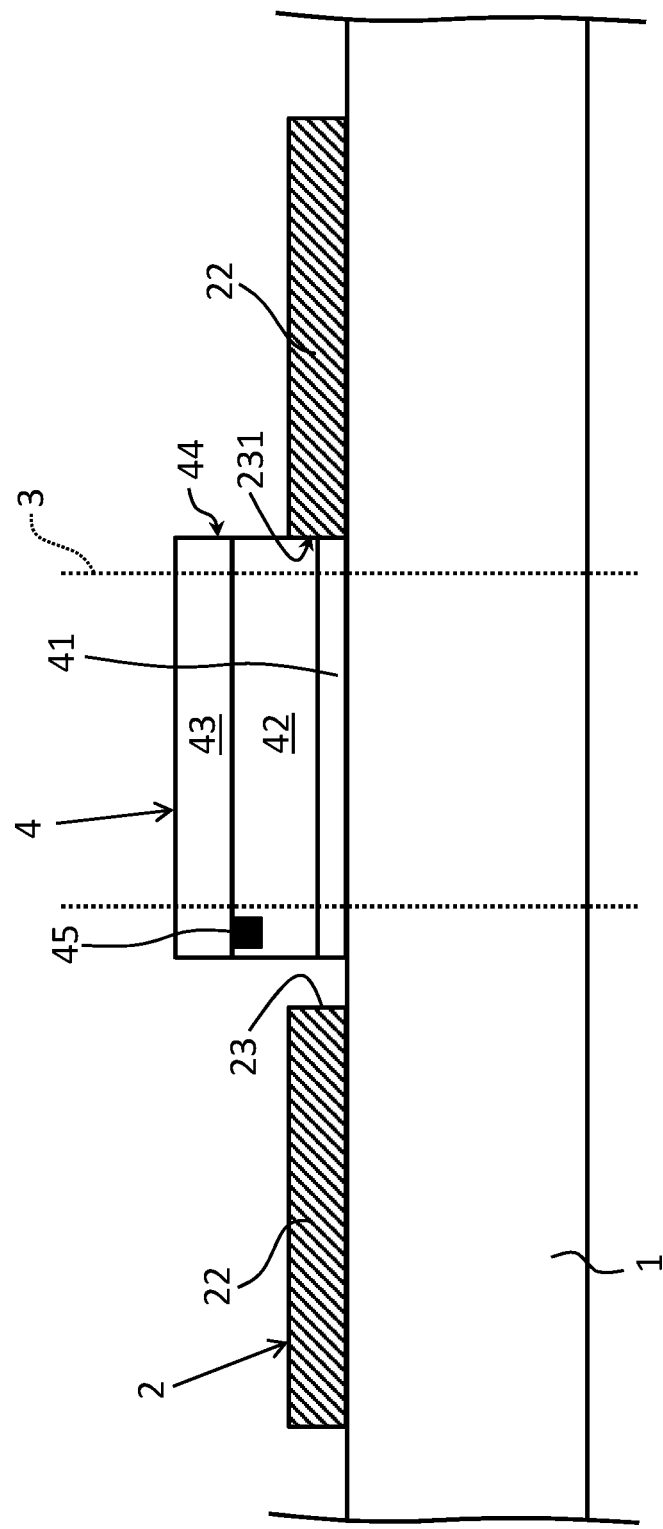

WINDSHIELD AND WINDSHIELD MANUFACTURING METHOD

TECHNICAL FIELD

The present invention relates to a windshield and a windshield manufacturing method.

BACKGROUND ART

In general, windshields for automobiles are provided with a blocking layer for blocking a field of vision from the outside of a vehicle. This blocking layer is provided along the peripheral edge portion of the windshield, and conceals an adhesive or the like for attaching the windshield to the automobile from the outside of the vehicle.

In recent years, an in-vehicle system including a camera or the like for taking images of the outside of the vehicle has been proposed. With this in-vehicle system, for example, it is possible to recognize an oncoming vehicle, a preceding vehicle, a pedestrian, a traffic sign, a traffic lane line, and the like by analyzing images of subjects that have been taken using the camera, and thereby perform various types of driving support such as notifying a driver of danger, and the like.

However, in such an in-vehicle system, it is often the case that an information acquisition device such as a camera is installed at a position that is blocked by the blocking layer, such as a position near a supporting portion of a rearview mirror, or at a position near such a position. In such a case, there is a possibility that the blocking layer will inhibit the information acquisition device from acquiring information about the outside of the vehicle.

Therefore, conventionally, it has been proposed to provide a transmission window in a partial region of the blocking layer (Patent Literature 1, for example). For example, a region (transmission window) with high visible-light transmittance can be formed in a portion of the blocking layer by replacing a portion of an interlayer with a material with high visible-light transmittance or providing a region in which ceramic is not layered. The information acquisition device installed inside the vehicle can use the transmission window as an information acquisition region through which light passes to acquire information about the outside of the vehicle without being inhibited by the blocking layer.

CITATION LIST

Patent Literature

Patent Literature 1: JP 2010-180068A

SUMMARY OF INVENTION

Technical Problem

Patent Literature 1 proposes that a coating for providing an antifog function is applied to a glass plate in order to prevent fog. However, the information acquisition region is a relatively small region. Therefore, it is difficult to uniformly apply a coating on such a small region, and there is a possibility that unevenness (roughness) with which the information acquisition device will be inhibited from acquiring information is formed on the surface of the coating.

To address this, a method in which a film (antifog film) having an antifog function is used instead of a coating is conceivable as an alternative of the method for imparting the antifog function to the information acquisition region. It is easy to attach a film even to a small region such as the information acquisition region. Therefore, using a transparent antifog film with substantially no warping makes it easy to impart the antifog function to the information acquisition region without inhibiting the information acquisition device from acquiring the information.

However, the inventors of the present invention found that a problem as described below may arise when an antifog laminate such as a coating as mentioned above or an antifog film is used. That is, some antifog laminates include an antifog layer of a type whose ability in the antifog function depends on a temperature. For example, when an antifog layer of a water absorption type is used, the saturated water absorption amount (indicating the amount of water that can be absorbed) decreases as the temperature decreases, and the antifog function of the antifog layer is thus impaired.

However, the surface on the vehicle interior side of the information acquisition region is likely to be affected by the temperature of the outside of the vehicle due to ceramic or the like for forming the blocking layer not being layered thereon. Therefore, the vehicle interior side of the information acquisition region is located in an environment in which the temperature is likely to decrease and the antifog function of the antifog layer is likely to be impaired. In addition, the information acquisition region is relatively small, and therefore, the antifog laminate layered on the information acquisition region is also small. Accordingly, the impairment of the antifog function of the antifog layer has a significant effect on the prevention of fog on the information acquisition region. Therefore, the inventors of the present invention found that, when the antifog laminate is used on the information acquisition region, there is a possibility that the antifog function of the antifog layer will be impaired, and thus fog on the information acquisition region cannot be sufficiently prevented.

One aspect of the present invention has been made in view of such circumstances, and it is an object thereof to provide a technique with which the impairment of the antifog function of the information acquisition region can be suppressed.

Solution to Problem

The present invention employs the following configuration in order to solve the above-described problem.

In other words, a windshield according to an aspect of the present invention is a windshield for an automobile on which an information acquisition device capable of acquiring information from the outside of a vehicle by emitting and/or receiving light can be arranged, the windshield including: a glass plate including an information acquisition region that is opposite to the information acquisition device and through which the light passes; and an antifog laminate that includes a heat blocking layer and an antifog layer with antifog properties layered on one surface of the heat blocking layer, and that is layered on a surface on a vehicle interior side of the information acquisition region while the other surface of the heat blocking layer faces the surface on the vehicle interior side of the information acquisition region.

Dew condensation occurs on the glass plate when the temperature of the outside of the vehicle becomes lower than the temperature of the inside of the vehicle. At this time, if the surface on the vehicle interior side of the glass plate is likely to be cooled under the influence of the temperature of the outside of the vehicle, there is a possibility that the antifog function of the antifog layer of the antifog laminate layered on the surface on the vehicle interior side will be impaired. To address this, with this configuration, the heat blocking layer is provided between the antifog layer having antifog properties and the glass plate (information acquisition region), in the antifog laminate. Therefore, due to this heat blocking layer, it is possible to make it less likely that the antifog layer is affected by the temperature of the outside of the vehicle. That is, even if the surface on the vehicle interior side of the glass plate becomes cold, it will be possible to suppress a decrease in the temperature of the antifog layer as well since heat exchange is blocked by the heat blocking layer. Therefore, with this configuration, it is possible to suppress impairment of the antifog function of the information acquisition region.

It should be noted that there is no particular limitation on the information acquisition device as long as it can acquire information from the outside of a vehicle by emitting and/or receiving light. Various types of imaging devices, laser devices such as a radar for emitting and/or receiving a ray of light, light receiving devices for receiving signals from optical beacons, and the like may be used as the information acquisition device, for example.

Another embodiment of the windshield according to the above-described aspect may further include a blocking layer that is provided on the glass plate and blocks a field of vision from the outside of a vehicle, and have a configuration in which the blocking layer is provided with an opening that is arranged to correspond to the information acquisition region, and a bracket to which a cover for mounting the information acquisition device on the windshield is attached is arranged around the opening of the blocking layer and fixed such that at least a portion of the bracket is blocked by the blocking layer. With this configuration, the blocking layer and the information acquisition device are provided in the region surrounding the information acquisition region, and therefore, the temperature therearound is likely to rise due to the information acquisition device generating heat and the blocking layer being heated. In addition, as mentioned above, the temperature around the information acquisition region is less likely to decrease due to the heat blocking layer. Therefore, with this configuration, heat around the information acquisition region can be effectively utilized, thus making it possible to use the antifog laminate to efficiently prevent fog around the information acquisition region.

Another embodiment of the windshield according to the above-described aspect may have a configuration in which the planar size of the antifog laminate is larger than the planar size of the opening of the blocking layer. When the antifog laminate is of a type whose antifog ability depends on its size, such as a water absorption type that absorbs water vapor, as the size of the antifog laminate (especially the antifog layer) increases, the antifog ability imparted to the information acquisition region can be further enhanced. Therefore, with this embodiment, the planar size of the antifog laminate is made lager than the planar size of the opening that is arranged to correspond to the information acquisition region. This makes it possible to make the antifog laminate relatively larger and enhance the antifog ability imparted to the information acquisition region.

Another embodiment of the windshield according to the above-described aspect may have a configuration in which the bracket is formed in a frame shape, and the planar size of the antifog laminate is smaller than the internal size of the bracket. With this configuration, the planar size of the antifog laminate is made smaller than the internal size of the bracket, thus making it possible to prevent a portion of the antifog laminate from being on the bracket when the antifog laminate is layered on the information acquisition region. Accordingly, the antifog function can be appropriately imparted to the information acquisition region.

Another embodiment of the windshield according to the above-described aspect may have a configuration in which the planar size of the antifog laminate is smaller than the planar size of the opening of the blocking layer. With this configuration, the planar size of the antifog laminate is made smaller than the planar size of the opening of the blocking layer, thus making it possible to prevent a portion of the antifog laminate from being on the blocking layer. This makes it possible to almost prevent gaps (air bubbles) that inhibit the information acquisition device from acquiring information from being formed between the surface on the vehicle interior side of the information acquisition region and the antifog laminate while the antifog laminate is being layered on the surface on the vehicle interior side of the information acquisition region. Moreover, the antifog laminate does not straddle the step formed between the surface on the vehicle interior side of the information acquisition region and the blocking layer, and therefore, the antifog laminate can be easily layered on the information acquisition region. Furthermore, the blocking layer is made of a dark-colored ceramic or the like and may thus reach a high temperature (e.g., 105° C.). Therefore, even if only a portion of the antifog laminate is layered on the blocking layer, there is a possibility that the antifog laminate will be required to have high thermal resistance. By contrast, with the above-described configuration, the antifog laminate can be layered on the information acquisition region such that a portion thereof is not on the blocking layer, thus making it possible to also use an antifog laminate with relatively low thermal resistance. Moreover, in many cases, an antifog laminate (particularly a heat blocking layer) is made of a material that is more likely to thermally expand than a glass plate. Therefore, making the planar size of the antifog laminate smaller than the planar size of the opening of the blocking layer to form a gap between the antifog laminate and the edge of the opening of the blocking layer makes it possible to prevent the antifog laminate from expanding over the edge of the opening and peeling away from the surface on the vehicle interior side of the information acquisition region when the antifog laminate thermally expands.

Another embodiment of the windshield according to the above-described aspect may have a configuration in which the planar size of the opening of the blocking layer is larger than the planar size of the information acquisition region, and the planar size of the antifog laminate is larger than the planar size of the information acquisition region and smaller than the planar size of the opening of the blocking layer. With this configuration, the information acquisition region can be appropriately set due to the planar size of the opening of the blocking layer being made larger than the planar size of the information acquisition region, in addition to the above-mentioned functions and effects due to the planar size of the information acquisition region being made smaller than the planar size of the opening of the blocking layer. In addition, making the planar size of the antifog laminate lager than the planar size of the information acquisition region makes it possible to impart the antifog function to the entirety of the appropriately set information acquisition region by layering the antifog laminate so as to cover the entire information acquisition region.

Another embodiment of the windshield according to the above-described aspect may have a configuration in which at least a portion of an edge of the antifog laminate is in contact with an edge of the opening of the blocking layer. With this configuration, positioning can be performed using the edge of the opening of the blocking layer and the edge of the antifog laminate, thus making it possible to layer the antifog laminate on the information acquisition region accurately and easily.

Another embodiment of the windshield according to the above-described aspect may have a configuration in which an imaging device for taking images of the outside of the vehicle through the information acquisition region and a laser device for emitting and/or receiving a ray of light that serve as the information acquisition devices are lined up in a horizontal direction, and a portion where the edge of the opening of the blocking layer and the edge of the antifog laminate are in contact with each other is arranged on the imaging device side. When an imaging device and a laser device are compared, the angle of view, namely the information acquisition region, required for the imaging device is wider than that required for the laser device. To address this, with this configuration, a portion where the edge of the opening of the blocking layer and the edge of the antifog laminate are in contact with each other is arranged on the imaging device side, thus making it possible to prevent a portion on which the antifog laminate is not layered from entering the range of the angle of view of the imaging device. Moreover, when the antifog laminate is attached using a gluing agent (sticky layer), it is possible to prevent the gluing agent protruding from the edge of the antifog laminate from entering the angle of view of the imaging device and thereby inhibiting the imaging device from taking images.

Another embodiment of the windshield according to the above-described aspect may have a configuration in which the portion where the edge of the opening of the blocking layer and the edge of the antifog laminate are in contact with each other is arranged on one side in a left-right direction. With this configuration, the workability of attaching the antifog laminate can be enhanced.

Another embodiment of the windshield according to the above-described aspect may have a configuration in which the total thickness of the heat blocking layer and the antifog layer of the antifog laminate is larger than the thickness of the blocking layer. With this configuration, the total thickness of the heat blocking layer and the antifog layer in the antifog laminate is made lager than the thickness of the blocking layer, thus making it possible to prevent the blocking layer from physically interfering while the antifog laminate is being layered on the surface on the vehicle interior side of the information acquisition region. Therefore, the antifog laminate can be easily layered.

Another embodiment of the windshield according to the above-described aspect may have a configuration in which the thickness of the heat blocking layer of the antifog laminate is larger than the thickness of the blocking layer. With this configuration, the antifog laminate can be easily layered in the same manner as described above. Moreover, with this configuration, the thickness of the heat blocking layer can be made relatively large on the basis of the thickness of the blocking layer. This makes it possible to sufficiently suppress the dissipation of heat near the antifog layer to the outside of the vehicle through the information acquisition region. Therefore, with this configuration, it is possible to appropriately suppress impairment of the antifog ability of the antifog laminate.

Another embodiment of the windshield according to the above-described aspect may have a configuration in which the glass plate includes an outer glass plate arranged on a vehicle exterior side and an inner glass plate arranged on a vehicle interior side, an interlayer containing heat-ray absorbing particles is arranged between the outer glass plate and the inner glass plate, and the particles are not arranged in a region of the interlayer that overlaps the blocking layer and the opening in a plan view, and are arranged in the other region. With this configuration, the heat-ray absorbing particles are not arranged on the information acquisition region (opening), thus making it possible to prevent the particles from having an effect on the light emission and/or light reception performed by the information acquisition device. Moreover, the particles are not arranged at a position overlapping the blocking layer in a plan view, thus making it possible to allow light from the outside of the vehicle to reach the blocking layer even when the blocking layer is arranged on a surface on the vehicle interior side of the glass plate, and thereby allow the blocking layer to become warm. This makes it possible to make it less likely that the glass plate fogs up even in a state in which the temperature and humidity on the vehicle interior side are higher than those on the vehicle exterior side.

Another embodiment of the windshield according to the above-described aspect may have a configuration in which the antifog layer contains at least one type of polymer selected from the group consisting of urethane resin, epoxy resin, acrylic resin, polyvinyl acetal resin, and polyvinylalcohol resin, and the polymer is contained in an amount of 50 mass % or more and 99 mass % or less. In a case where a heat blocking layer is made of a material that is likely to thermally expand, when an antifog layer is made of a material that is unlikely to thermally expand, there is a possibility that the heat blocking layer will excessively expand compared with the antifog layer, and the antifog laminate thus curls up from the heat blocking layer side toward the antifog layer side. That is, there is a possibility that the antifog laminate will peel away from the surface on the vehicle interior side of the information acquisition region. To address this, with the above-described configuration, it is possible to make relatively likely that the antifog layer thermally expands compared with a case where a hydrophilic inorganic material is used. This makes it possible to allow the antifog layer to follow the thermally expanding heat blocking layer, and therefore, it is possible to make it less likely that the antifog laminate peels away.

Another embodiment of the windshield according to the above-described aspect may have a configuration in which the antifog laminate is formed in a rectangular shape in a plan view, and corner portions of the antifog laminate are rounded. With this configuration, it is possible to make it less likely that the antifog laminate peels away compared with a case where corner portions have a sharp shape.

Another embodiment of the windshield according to the above-described aspect may have a configuration in which at least one corner portion of the corner portions of the antifog laminate has a smaller curvature of roundness than those of the other corner portions. With this configuration, the workability of replacing the antifog laminate can be enhanced.

Another embodiment of the windshield according to the above-described aspect may have a configuration in which a lamination indication mark for indicating that the antifog laminate is layered is provided on the heat blocking layer at a position on an outer side in an in-plane direction of the information acquisition region. When an antifog laminate is made of a completely transparent material, even if the antifog laminate is layered on the surface on the vehicle interior side of the information acquisition region, it may not be possible to confirm this. To address this, with this configuration, providing the lamination indication mark on the outer side in the in-plane direction of the information acquisition region makes it possible to easily confirm that the antifog laminate is layered on the surface on the vehicle interior side of the information acquisition region while the information acquisition device is not inhibited from acquiring information.

Another embodiment of the windshield according to the above-described aspect may have a configuration in which the heat blocking layer is made of a material having a thermal conductivity of $5\times10^{-4}$ cal/cm·sec·° C. or less. With this configuration, the heat blocking layer is made of the material with a thermal conductivity of $5\times10^{-4}$ cal/cm·sec·° C. or lower, and the heat blocking layer thus sufficiently suppresses the dissipation of heat near the antifog layer to the outside of the vehicle through the information acquisition region. Therefore, with this configuration, it is possible to appropriately suppress impairment of the antifog ability of the antifog film. It should be noted that examples of a material whose thermal conductivity satisfies the above-mentioned conditions include COSMOSHINE A4300 (TOYOBO Co., Ltd.) and Lumirror (TORAY INDUSTRIES Inc.).

Another embodiment of the windshield according to the above-described aspect may have a configuration in which the antifog layer contains a surfactant. When a liquid agent is applied to a heat blocking layer to form an antifog layer, there is a possibility that the surface of the antifog layer will become more uneven, and significant warping that adversely affects the acquisition of information by the information acquisition device thus occurs. To address this, with this configuration, the solution containing a surfactant is likely to spread on the heat blocking layer, thus making it possible to make it less likely that the surface of the formed antifog layer becomes uneven. Therefore, it is possible to suppress warping of the antifog layer.

Another embodiment of the windshield according to the above-described aspect may have a configuration in which the antifog laminate is formed to have a trapezoidal cross section in which a side located on the antifog layer side is shorter than a side located on the heat blocking layer side. With this configuration, when the antifog laminate is layered so as to fit in the opening of the blocking layer, gaps can be formed between the legs (oblique sides) of the trapezoidal shape and the edge of the opening of the blocking layer, thus making it possible to allow the antifog laminate to thermally expand by amounts corresponding to the gaps even if the surroundings of the antifog laminate reach a high temperature. Therefore, it is possible to suppress the detachment of the antifog laminate caused by the thermal expansion of the antifog laminate.

Another embodiment of the windshield according to the above-described aspect may have a configuration in which an imaging device for taking images of the outside of a vehicle through the information acquisition region and a laser device for emitting and/or receiving a ray of light that serve as the information acquisition devices are lined up in a horizontal direction, and in the trapezoidal shape seen in the antifog laminate, a leg located on a side on which the laser device is arranged is inclined at a larger angle than an angle at a leg located on a side on which the imaging device is arranged is inclined. As described above, when an imaging device and a laser device are compared, the angle of view, namely the information acquisition region, required for the imaging device is wider than that required for the laser device. To address this, with this configuration, the inclination angle of the leg on a side on which the imaging device is arranged is set to be smaller than or equal to the inclination angle of the leg on a side on which the laser device is arranged, thus making it possible to make it less likely that the edge of the antifog laminate, namely the leg of the trapezoid, enters the angle of view of the imaging device. Therefore, it is possible to prevent the edge of the antifog laminate from entering the angle of view and thereby inhibiting the imaging device from taking images.

Another embodiment of the windshield according to the above-described aspect may have a configuration in which the heat blocking layer is constituted by a plurality of layers. With this configuration, the heat blocking layer can more reliably block heat exchange, thus making it possible to make it less likely that the antifog layer is affected by the temperature outside of the vehicle, and thus to suppress impairment of the antifog function of the information acquisition region.

A method for manufacturing a windshield according to an aspect of the present invention is a method for manufacturing a windshield for an automobile on which an information acquisition device capable of acquiring information from the outside of a vehicle by emitting and/or receiving light can be arranged, the method including: a first step of preparing a glass plate including an information acquisition region that is opposite to the information acquisition device and through which the light passes, the glass plate being provided with a blocking layer that blocks a field of vision from the outside of the vehicle and is provided with an opening arranged to correspond to the information acquisition region; a second step of layering, to a surface on a vehicle interior side of the information acquisition region, an antifog laminate that includes a heat blocking layer and an antifog layer with antifog properties layered on one surface of the heat blocking layer, while the other surface of the heat blocking layer faces the surface on the vehicle interior side of the information acquisition region; and a third step of arranging, around the opening of the blocking layer, a bracket to which a cover for mounting the information acquisition device on the windshield is attached and fixing the bracket such that at least a portion of the bracket is blocked by the blocking layer. With this configuration, the heat blocking layer can be used to make it less likely that the temperature near the information acquisition region decreases. Therefore, a windshield capable of suppressing the impairment of the antifog function of the information acquisition region can be provided.

Another embodiment of the method for manufacturing a windshield according to the above-described aspect may have a configuration in which the planar size of the antifog laminate is larger than the planar size of the opening of the blocking layer. With this configuration, it is possible to make the antifog laminate relatively larger and enhance the antifog ability imparted to the information acquisition region.

Another embodiment of the method for manufacturing a windshield according to the above-described aspect may have a configuration in which the bracket is formed in a frame shape, and the planar size of the antifog laminate is smaller than the internal size of the bracket. With this configuration, the antifog function can be appropriately imparted to the information acquisition region.

Another embodiment of the method for manufacturing a windshield according to the above-described aspect may have a configuration in which the planar size of the antifog laminate is smaller than the planar size of the opening of the blocking layer. With this configuration, it is possible to prevent gaps (air bubbles) that inhibit the information acquisition device from acquiring information from being formed between the surface on the vehicle interior side of the information acquisition region and the antifog laminate. Moreover, the antifog laminate does not straddle the step formed between the surface on the vehicle interior side of the information acquisition region and the blocking layer, and therefore, the antifog laminate can be easily layered on the information acquisition region. Moreover, the antifog laminate can be layered on the information acquisition region such that a portion thereof is not on the blocking layer, thus making it possible to also use an antifog laminate with relatively low thermal resistance. In addition, making the planar size of the antifog laminate smaller than the planar size of the opening of the blocking layer to form a gap between the antifog laminate and the edge of the opening of the blocking layer makes it possible to prevent the antifog laminate from expanding over the edge of the opening and peeling away from the surface on the vehicle interior side of the information acquisition region when the antifog film thermally expands.

Another embodiment of the method for manufacturing a windshield according to the above-described aspect may have a configuration in which the planar size of the opening of the blocking layer is larger than the planar size of the information acquisition region, and the planar size of the antifog laminate is larger than the planar size of the information acquisition region and smaller than the planar size of the opening of the blocking layer. With this configuration, the information acquisition region can be appropriately set due to the planar size of the opening of the blocking layer being made larger than the planar size of the information acquisition region, in addition to the above-mentioned functions and effects due to the planar size of the information acquisition region being made smaller than the planar size of the opening of the blocking layer. In addition, making the planar size of the antifog laminate lager than the planar size of the information acquisition region makes it possible to impart the antifog function to the entirety of the appropriately set information acquisition region by layering the antifog laminate so as to cover the entire information acquisition region.

Another embodiment of the method for manufacturing a windshield according to the above-described aspect may have a configuration in which, in the second step, the antifog laminate is layered on the surface on the vehicle interior side of the information acquisition region such that at least a portion of an edge of the antifog laminate comes into contact with an edge of the opening of the blocking layer. With this configuration, it is possible to layer the antifog laminate to the information acquisition region accurately and easily.

Another embodiment of the method for manufacturing a windshield according to the above-described aspect may have a configuration in which an imaging device for taking images of the outside of the vehicle through the information acquisition region and a laser device for emitting and/or receiving a ray of light that serve as the information acquisition devices are lined up in a horizontal direction, and a portion where the edge of the opening of the blocking layer and the edge of the antifog laminate are in contact with each other is arranged on the imaging device side. With this configuration, a portion where the edge of the opening of the blocking layer and the edge of the antifog laminate are in contact with each other is arranged on the imaging device side, thus making it possible to prevent a portion to which the antifog laminate is not layered from entering the range of the angle of view of the imaging device. Moreover, when the antifog laminate is attached using a gluing agent (sticky layer), it is possible to prevent the gluing agent protruding from the edge of the antifog laminate from entering the angle of view of the imaging device and thereby inhibiting the imaging device from taking images.

Another embodiment of the method for manufacturing a windshield according to the above-described aspect may have a configuration in which the portion where the edge of the opening of the blocking layer and the edge of the antifog laminate are in contact with each other is arranged on one side in a left-right direction. With this configuration, the workability of attaching the antifog laminate can be enhanced.

Another embodiment of the method for manufacturing a windshield according to the above-described aspect may have a configuration in which the total thickness of the heat blocking layer and the antifog layer of the antifog laminate is larger than the thickness of the blocking layer. With this configuration, the antifog laminate can be easily layered.

Another embodiment of the method for manufacturing a windshield according to the above-described aspect may have a configuration in which the thickness of the heat blocking layer of the antifog laminate is larger than the thickness of the blocking layer. With this configuration, the thickness of the heat blocking layer can be made relatively large on the basis of the thickness of the blocking layer, thus making it possible to appropriately suppress impairment of the antifog ability of the antifog laminate.

Another embodiment of the method for manufacturing a windshield according to the above-described aspect may have a configuration in which the glass plate includes an outer glass plate arranged on a vehicle exterior side and an inner glass plate arranged on a vehicle interior side, an interlayer containing heat-ray absorbing particles is arranged between the outer glass plate and the inner glass plate, and the particles are not arranged in a region of the interlayer that overlaps the blocking layer and the opening in a plan view, and are arranged in the other region. With this configuration, it is possible to prevent the heat-ray absorbing particles from having an effect on the light emission and/or light reception performed by the information acquisition device. Moreover, it is possible to allow the blocking layer to become warm easily, thus making it possible to make it less likely that the glass plate fogs up.

Another embodiment of the method for manufacturing a windshield according to the above-described aspect may have a configuration in which the antifog layer contains at least one type of polymer selected from the group consisting of urethane resin, epoxy resin, acrylic resin, polyvinyl acetal resin, and polyvinylalcohol resin, and the polymer is contained in an amount of 50 mass % or more and 99 mass % or less. With this configuration, it is possible to allow the antifog layer to follow the thermally expanding heat blocking layer, and therefore, it is possible to make it less likely that the antifog laminate will peel away.

Another embodiment of the method for manufacturing a windshield according to the above-described aspect may have a configuration in which the antifog laminate is formed in a rectangular shape in a plan view, and corner portions of the antifog laminate are rounded. With this configuration, it is possible to make it less likely that the antifog laminate will peel away.

Another embodiment of the method for manufacturing a windshield according to the above-described aspect may have a configuration in which at least one corner portion of the corner portions of the antifog laminate has a smaller curvature of roundness than those of the other corner portions. With this configuration, the workability of replacing the antifog laminate can be enhanced.

Another embodiment of the method for manufacturing a windshield according to the above-described aspect may have a configuration in which a lamination indication mark for indicating that the antifog laminate is layered is provided on the heat blocking layer at a position on an outer side in an in-plane direction of the information acquisition region. With this configuration, providing the lamination indication mark on the outer side in the in-plane direction of the information acquisition region makes it possible to easily confirm that the antifog laminate is layered on the surface on the vehicle interior side of the information acquisition region while the information acquisition device is not inhibited from acquiring information.

Another embodiment of the method for manufacturing a windshield according to the above-described aspect may have a configuration in which the heat blocking layer is made of a material having a thermal conductivity of $5 \times 10^{-4}$ cal/cm·sec·° C. or less. With this configuration, it is possible to appropriately suppress impairment of the antifog ability of the antifog laminate caused by a decrease in temperature near the antifog layer.

Another embodiment of the method for manufacturing a windshield according to the above-described aspect may have a configuration the antifog layer contains a surfactant. With this configuration, it is possible to suppress warping of the antifog layer.

Another embodiment of the method for manufacturing a windshield according to the above-described aspect may have a configuration in which the antifog laminate is formed to have a trapezoidal cross section in which a side located on the antifog layer side is shorter than a side located on the heat blocking layer side. With this configuration, the antifog laminate can be easily layered. Furthermore, it is possible to suppress the detachment of the antifog laminate caused by the thermal expansion of the antifog laminate.

Another embodiment of the method for manufacturing a windshield according to the above-described aspect may have a configuration in which an imaging device for taking images of the outside of a vehicle through the information acquisition region and a laser device for emitting and/or receiving a ray of light that serve as the information acquisition devices are lined up in a horizontal direction, and in the trapezoidal shape seen in the antifog laminate, a leg located on a side on which the laser device is arranged is inclined at a larger angle than an angle at a leg located on a side on which the imaging device is arranged is inclined. With this configuration, it is possible to prevent the edge of the antifog laminate from entering the angle of view and thereby inhibiting the imaging device from taking images.

Another embodiment of the method for manufacturing a windshield according to the above-described aspect may have a configuration in which the heat blocking layer is constituted by a plurality of layers. With this configuration, the heat blocking layer can more reliably block heat exchange, thus making it possible to make it less likely that the antifog layer is affected by the temperature of the outside of the vehicle, and thus to suppress impairment of the antifog function of the information acquisition region.

Advantageous Effects of the Invention

With the present invention, it is possible to suppress impairment of the antifog function of the information acquisition region.

BRIEF DESCRIPTION OF DRAWINGS

FIG. 6A shows an example of a state in which waterdrops attach to an antifog layer.

FIG. 6B shows an example of a state in which waterdrops attach to the antifog layer.

FIG. 9A schematically shows an example of a manufacturing process of the windshield according to the embodiment.

FIG. 9B schematically shows an example of the manufacturing process of the windshield according to the embodiment.

DESCRIPTION OF EMBODIMENTS

Hereinafter, an embodiment (also referred to as "this embodiment" hereinafter) according to an aspect of the present invention will be described with reference to the drawings. However, this embodiment described below is merely an example of the present invention in all respects. It goes without saying that various improvements and modifications can be performed without departing from the scope of the present invention. In other words, in the implementation of the present invention, the specific configuration corresponding to the embodiment may be employed as appropriate. It should be noted that, in the following description, the orientations in the diagrams are used as standards for the sake of convenience.

§ 1 Configuration Example

Figure 1:
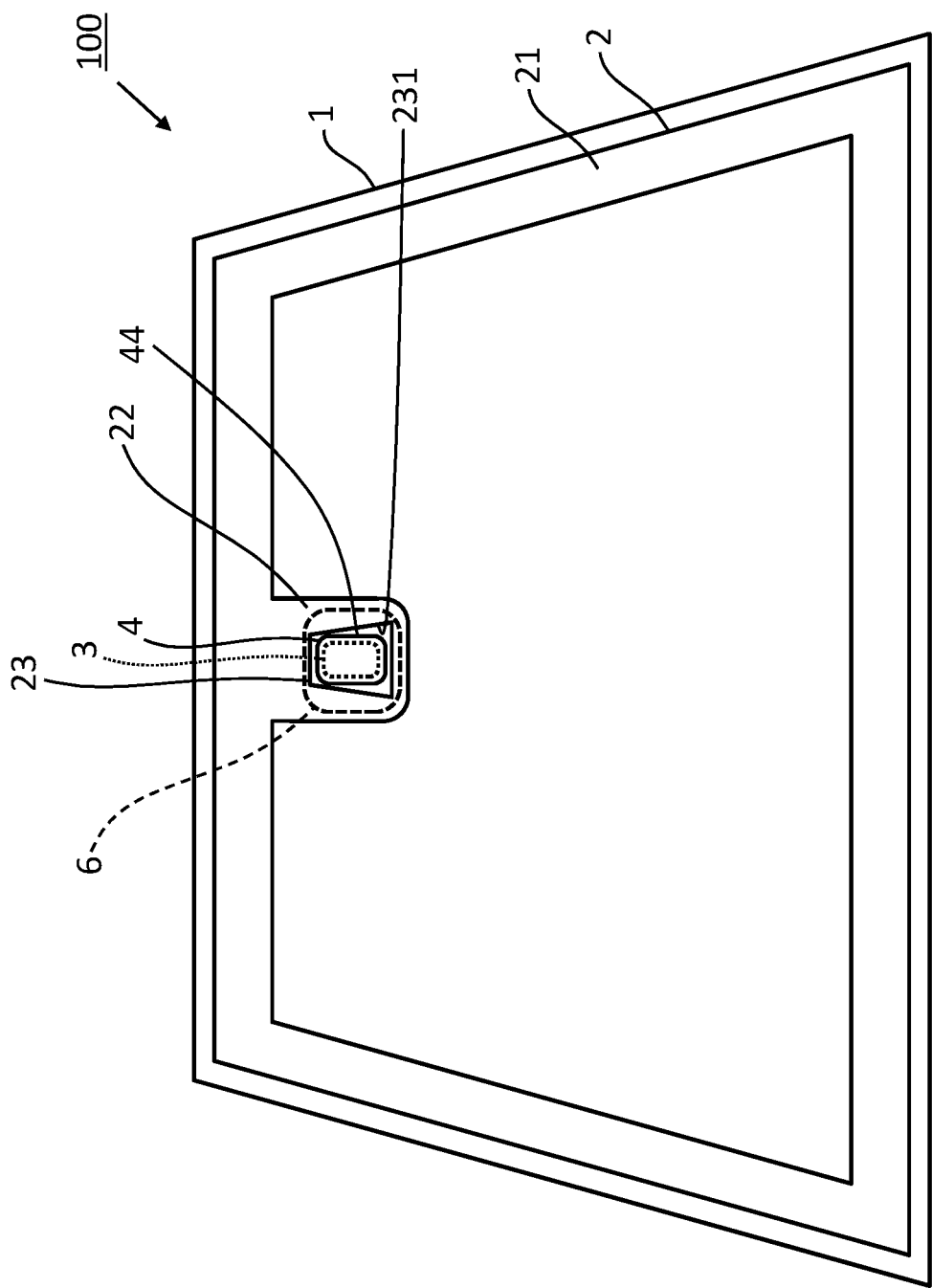
FIG. 1 is a schematic front view showing an example of a windshield according to an embodiment.
Figure 2:
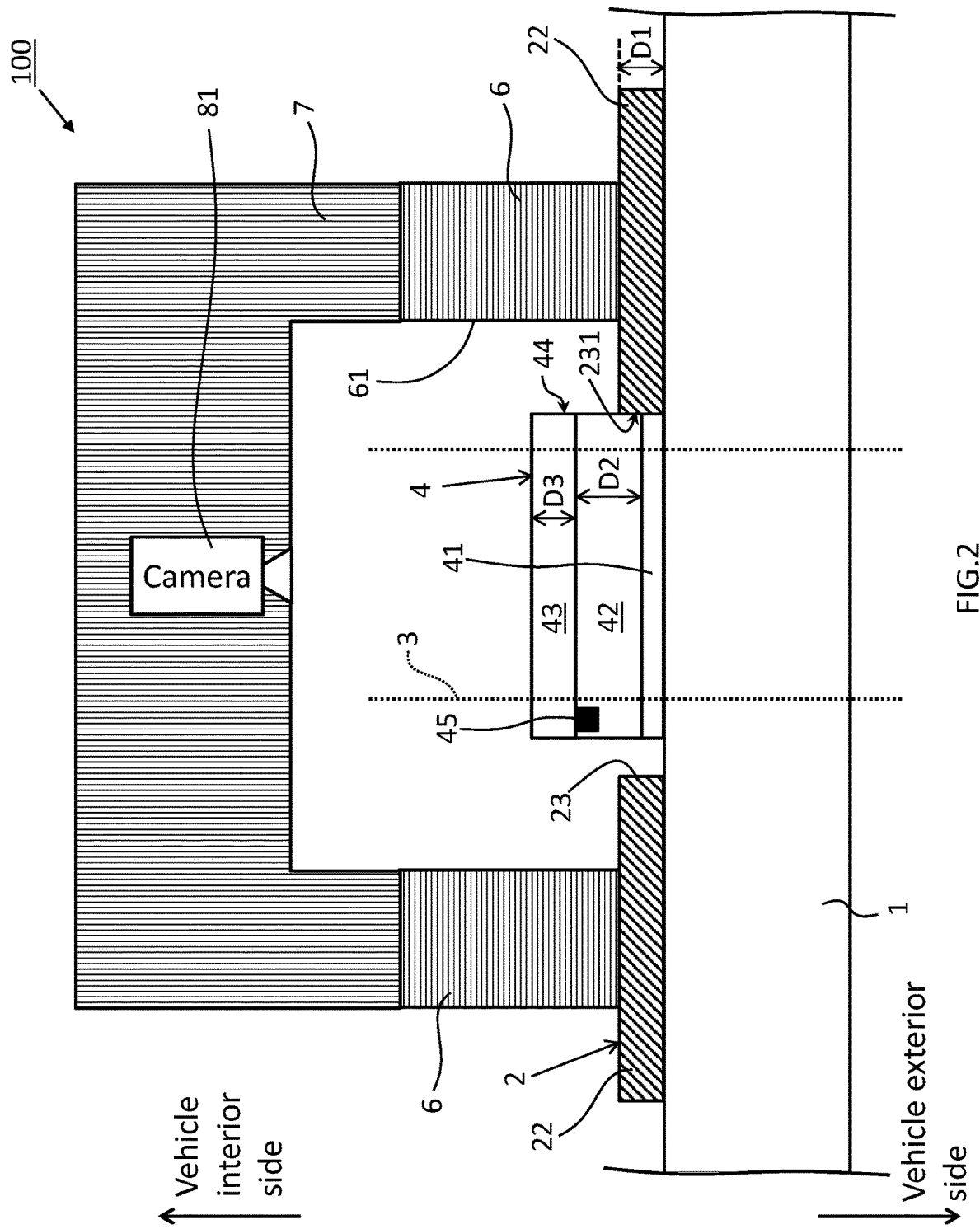
FIG. 2 is a schematic partial cross-sectional view showing an example of the vicinity of an information acquisition region of the windshield according to the embodiment.

First, a windshield 100 according to this embodiment will be described with reference to FIGS. 1 and 2. FIG. 1 is a schematic front view showing an example of the windshield 100 according to this embodiment. FIG. 2 is a schematic partial cross-sectional view showing an example of the vicinity of an information acquisition region 3 of the windshield according to this embodiment.

As shown in the examples in FIGS. 1 and 2, the windshield 100 according to this embodiment includes a glass plate 1, and a blocking layer 2 that is made of a dark-colored ceramic and blocks a field of vision from the outside of a vehicle. The blocking layer 2 is provided along the peripheral edge portion of the glass plate 1, and includes a peripheral edge portion 21 having an annular shape and a protruding portion 22 protruding inward in the in-plane direction from the center of the upper side of the peripheral edge portion 21.

An opening 23 where ceramic is not layered is provided in the protruding portion 22, and a frame-shaped bracket 6 is fixed around the opening 23. A cover 7 for mounting an information acquisition device that acquires information from the outside of a vehicle by emitting and/or receiving light can be attached to the bracket 6. Accordingly, the windshield 100 is configured such that an information acquisition device can be arranged inside a vehicle.

In this embodiment, a camera 81, which is an example of the information acquisition device, is attached inside a vehicle. The camera 81 corresponds to the "imaging device" of the present invention. When the camera 81 is attached inside the vehicle, the information acquisition region 3 through which light passes is set in a region of the glass plate 1 that faces the camera 81 and located within the opening 23. The camera 81 acquires information about the outside of the vehicle through this information acquisition region 3. It should be noted that a radar (not shown) can also be attached to a position facing the information acquisition region 3. This radar corresponds to the "laser device" of the present invention.

An antifog film 4 is layered on (attached to) a surface on the vehicle interior side of the information acquisition region 3. The antifog film 4 corresponds to the "antifog laminate" of the present invention. The antifog film 4 includes an antifog layer 43 having antifog properties and a heat blocking layer 42 for blocking the dissipation of heat from the inside of the vehicle toward the outside of the vehicle. The antifog layer 43 is arranged as the outermost layer, and the heat blocking layer 42 is arranged between the antifog layer 43 and the glass plate 1 (information acquisition region 3). Accordingly, in this embodiment, it is possible to make it less likely that the temperature near the information acquisition region 3 decreases, and to suppress impairment of the antifog function of the information acquisition region 3. Hereinafter, constituent elements will be described.

Glass Plate

Figure 3:
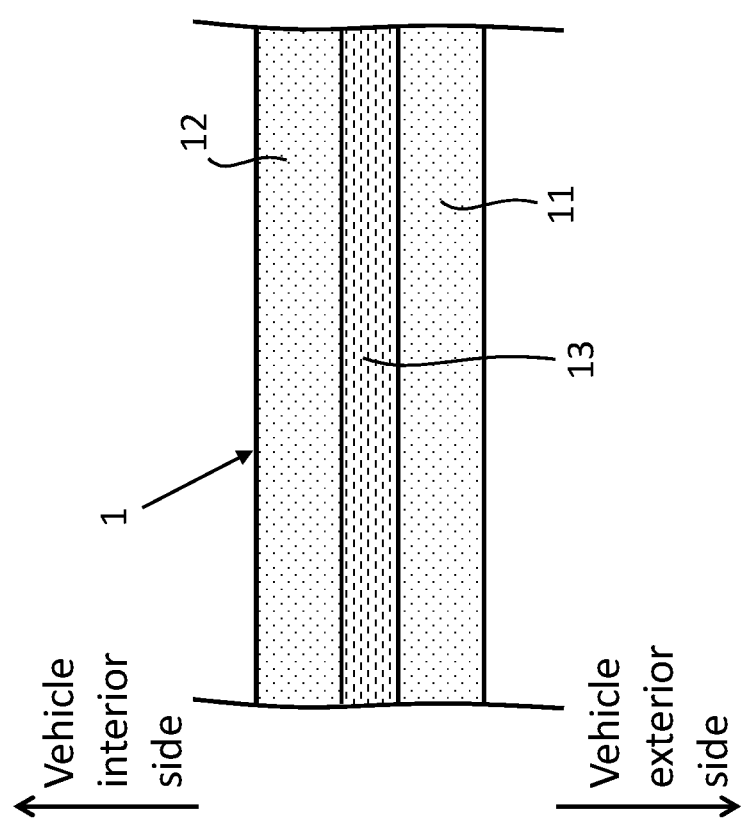
FIG. 3 is a schematic cross-sectional view showing an example of a glass plate according to the embodiment.

First, the glass plate 1 will be described also referring to FIG. 3. FIG. 3 is a schematic cross-sectional view showing an example of the glass plate 1 according to this embodiment. As shown in FIG. 3, the glass plate 1 includes an outer glass plate 11 arranged on the vehicle exterior side, and an inner glass plate 12 arranged on the vehicle interior side. An interlayer 13 is arranged between the outer glass plate 11 and the inner glass plate 12, and the surface on the vehicle interior side of the outer glass plate 11 and the surface on the vehicle exterior side of the inner glass plate 12 are joined together via this interlayer 13. Accordingly, the glass plate 1 is configured as so-called laminated glass.

Outer Glass Plate and Inner Glass Plate

The glass plates (11, 12) have substantially the same shape, and their shape is trapezoidal in a plan view. The glass plates (11, 12) may curve in a direction orthogonal to the surface or be flat in shape. For example, the glass plates (11, 12) may curve such that the surface on the vehicle exterior side is convex and the surface on the vehicle interior side is concave.

Known glass plates can be used as the glass plates (11, 12). The glass plates (11, 12) may be made of heat-ray absorbing glass, clear glass, green glass, UV green glass, or the like, for example. It should be noted that the glass plates (11, 12) are configured such that visible light transmittance that conforms to the safety standards of the country in which the automobile is to be used is attained. For example, the glass plates (11, 12) may be configured such that the transmittance of visible light (380 nm to 780 nm) is 70% or more, as defined in JIS R 3211. It should be noted that this transmittance can be measured, as defined in JIS R 3212 (3.11 Visible light transmittance test), using a spectrometric method defined in JIS Z 8722. Moreover, adjustments can also be made so that the outer glass plate 11 ensures a desired solar absorptance and the inner glass plate 12 provides visible light transmittance that meets safety standards, for example. An example of the composition of clear glass and an example of the composition of heat-ray absorbing glass are shown below as an example of the composition of glass that can be used to form the glass plates (11, 12).

Clear Glass $SiO_2$: 70 to 73 mass %
$Al_2O_3$: 0.6 to 2.4 mass %
CaO: 7 to 12 mass %
MgO: 1.0 to 4.5 mass %
$R_2O$: 13 to 15 mass % (R is an alkali metal)
Total iron oxide (T-$Fe_2O_3$) in terms of $Fe_2O_3$: 0.08 to 0.14 mass %

Heat-Ray Absorbing Glass

With regard to the composition of heat-ray absorbing glass, a composition obtained, which is based on the composition of clear glass, by setting the ratio of the total iron oxide (T-$Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass % and reducing the components (mainly $SiO_2$ and $Al_2O_3$) forming the framework of glass by an amount corresponding to the increases in T-$Fe_2O_3$, $CeO_2$, and $TiO_2$ can be used, for example.

Although there is no particular limitation on the thickness of the glass plate 1 according to this embodiment, the total thickness of the glass plates (11, 12) is preferably set to 2.5 mm to 10.6 mm, more preferably 2.6 mm to 3.8 mm, and even more preferably 2.7 mm to 3.2 mm, from the viewpoint of weight reduction. As described above, it is sufficient that the total thickness of the glass plates (11, 12) is reduced in order to reduce the weight. Although there is no particular limitation on the thicknesses of the glass plates (11, 12), the thicknesses of the glass plates (11, 12) can be determined as described below, for example.

In other words, the outer glass plate 11 mainly requires durability and impact resistance against impact with flying objects such as small stones, and the like. On the other hand, the weight increases as the thickness of the outer glass plate 11 increases, which is not preferable. From this viewpoint, the thickness of the outer glass plate 11 is preferably 1.6 mm to 2.5 mm, and more preferably 1.9 mm to 2.1 mm. It is possible to determine which thickness to employ as appropriate according to the embodiment.

On the other hand, the thickness of the inner glass plate 12 can be made equal to the thickness of the outer glass plate 11, but in order to reduce the weight of the glass plate 1, for example, the thickness can be made smaller than that of the outer glass plate 11. Specifically, when the strength of the glass is taken into consideration, the thickness of the inner glass plate 12 is preferably 0.6 mm to 2.1 mm, more preferably 0.8 mm to 1.6 mm, and even more preferably 1.0 mm to 1.4 mm. Furthermore, the thickness of the inner glass plate 12 is preferably 0.8 mm to 1.3 mm. For the inner glass plate 12 as well, it is possible to determine which thickness to employ as appropriate according to the embodiment.

Interlayer

The interlayer 13 is sandwiched between the glass plates (11, 12) and joins the glass plates (11, 12) together. The interlayer 13 can be variously configured according to the embodiment. For example, a configuration is possible in which the interlayer 13 is constituted by three layers, namely a soft core layer and two outer layers that are harder than the core layer and between which the core layer is sandwiched. The damage resistance and noise blocking of the glass plate 1 can be enhanced by forming the interlayer 13 with multiple layers including soft layers and hard layers as described above.

Also, the material of the interlayer 13 need not be particularly limited, and may be selected as appropriate according to the embodiment. For example, if the interlayer 13 is formed with multiple layers having different hardnesses as described above, it is possible to use polyvinyl butyral resin (PVB) for the hard outer layers. The polyvinyl butyral resin (PVB) is preferable as the material of the outer layers because it has excellent adhesiveness with the outer glass plate 11 and the inner glass plate 12 and excellent penetration resistance. Moreover, ethylene vinyl acetate resin (EVA) or polyvinyl acetal resin that is softer than the polyvinyl butyral resin used for the outer layers can be used for the soft core layer.

It should be noted that, in general, the hardness of a polyvinyl acetal resin can be controlled by adjusting (a) the degree of polymerization of polyvinyl alcohol, which is the starting material, (b) the degree of acetalization, (c) the type of plasticizer, (d) the ratio of the plasticizer added, and the like. Accordingly, a hard polyvinyl acetal resin that is used for the outer layers and a soft polyvinyl acetal resin that is used for the core layer may be produced by appropriately adjusting at least one of the conditions of (a) to (d).

Furthermore, the hardness of a polyvinyl acetal resin can be controlled based on the type of aldehyde that is used for acetalization and whether co-acetalization using a plurality of kinds of aldehydes or pure acetalization using a single kind of aldehyde is performed. Although not necessarily applicable to every case, the larger the number of carbon atoms of the aldehyde that is used to obtain a polyvinyl acetal resin is, the softer the resulting polyvinyl acetal resin tends to be. Accordingly, if the outer layers are made of a polyvinyl butyral resin, for example, a polyvinyl acetal resin that is obtained by acetalizing an aldehyde having 5 or more carbon atoms (e.g., n-hexyl aldehyde, 2-ethylbutyl aldehyde, n-heptyl aldehyde, or n-octyl aldehyde) with polyvinyl alcohol can be used for the core layer.

Moreover, the total thickness of the interlayer 13 can be set as appropriate according to the embodiment. For example, the total thickness of the interlayer 13 can be set to 0.3 to 6.0 mm, preferably 0.5 to 4.0 mm, and more preferably 0.6 to 2.0 mm. If the interlayer 13 is constituted by a three-layer structure including a core layer and two outer layers between which the core layer is sandwiched, the thickness of the core layer is preferably 0.1 to 2.0 mm, and more preferably 0.1 to 0.6 mm. On the other hand, the thickness of each outer layer is preferably larger than the thickness of the core layer, and specifically, is preferably 0.1 to 2.0 mm, and more preferably 0.1 to 1.0 mm.

Although there is no particular limitation on the method for manufacturing such an interlayer 13, examples of the manufacturing method include a method in which a resin component such as the above-described polyvinyl acetal resin, a plasticizer, and other additives, if necessary, are mixed and uniformly kneaded, and then the layers are collectively extruded, and a method in which two or more resin films that are produced using this method are laminated through a pressing process, a lamination process, or the like. In the method of laminating through the pressing process, the lamination process, or the like, each of the resin films before laminating may have a single-layer structure or a multilayer structure. Moreover, the interlayer 13 may include a single layer instead of the plurality of layers as mentioned above.

Blocking Layer

Figure 4:
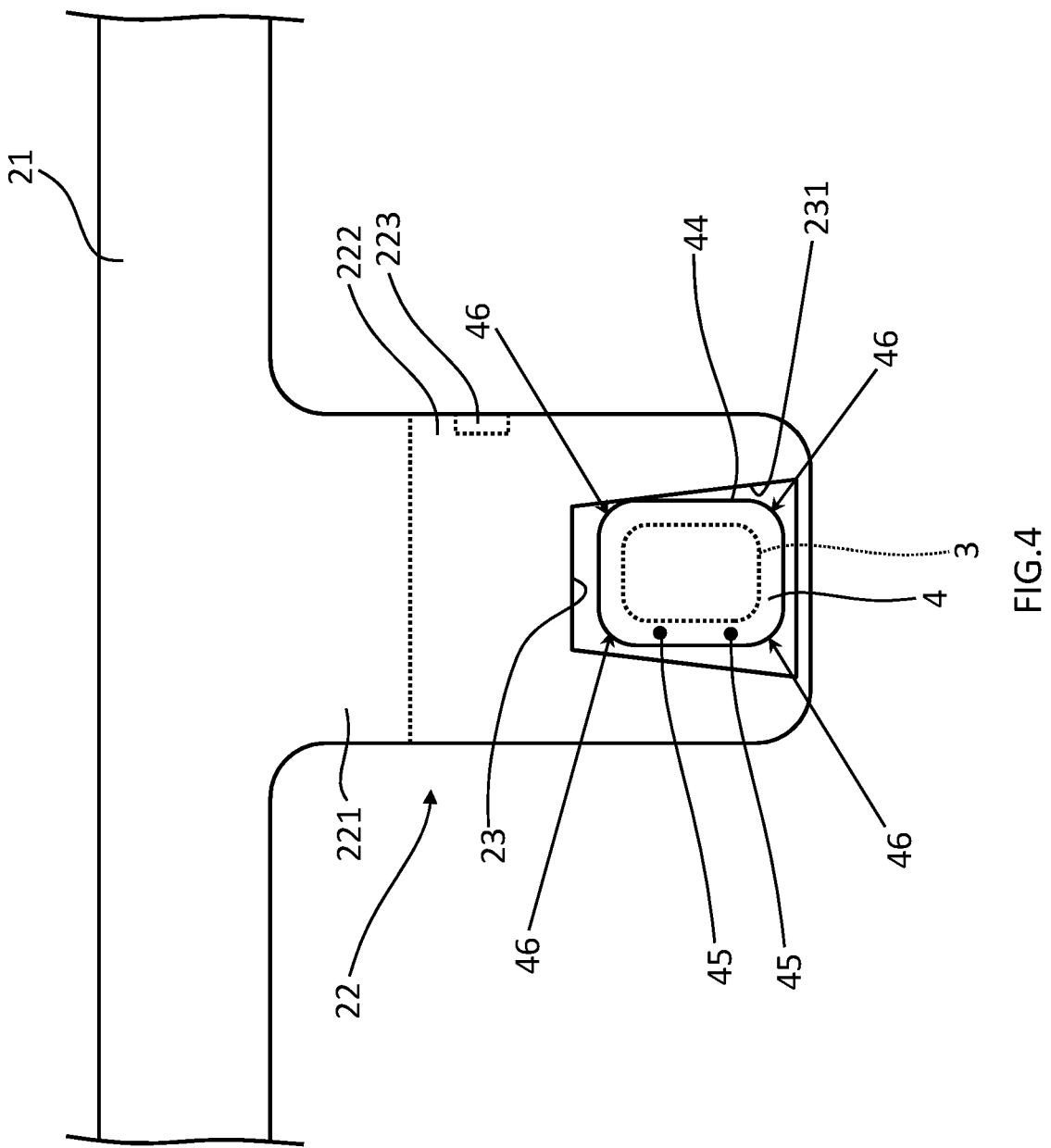
FIG. 4 is a schematic partially enlarged view showing an example of the vicinity of the information acquisition region of the windshield according to the embodiment.
Figure 5:
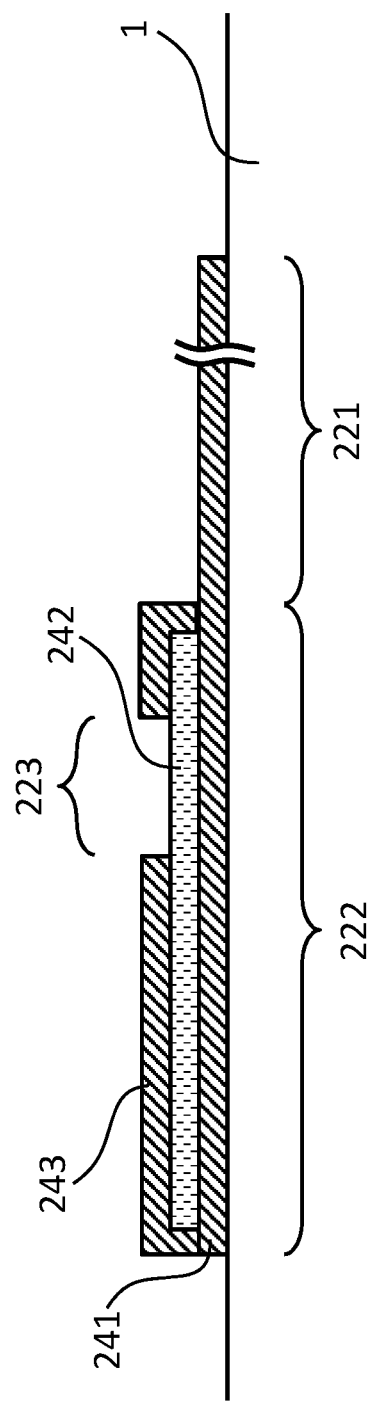
FIG. 5 is a schematic cross-sectional view showing an example of a blocking layer according to the embodiment.

Next, the blocking layer 2 for blocking a field of vision from the outside of a vehicle will be described also referring to FIGS. 4 and 5. FIG. 4 is a schematic partially enlarged view showing an example of the vicinity of the information acquisition region 3 of the windshield 100 according to this embodiment. FIG. 5 is a schematic cross-sectional view showing an example of the blocking layer 2 according to this embodiment.

As shown in FIGS. 2 and 5, the blocking layer 2 is provided on the surface on the vehicle interior side of the glass plate 1, that is, the surface on the vehicle interior side of the inner glass plate 12. The blocking layer 2 includes the peripheral edge portion 21 that is layered in an annular shape along the peripheral edge portion of the surface on the vehicle interior side of the glass plate 1, and a protruding portion 22 that has a substantially rectangular shape and protrudes inward in the in-plane direction from the center of the upper side of the peripheral edge portion 21.

As shown in FIGS. 1 and 4, the opening 23 arranged to correspond to the information acquisition region 3 is provided in the protruding portion 22. The shape of the opening 23 may be selected as appropriate according to the embodiment. In this embodiment, the opening 23 is formed in a substantially trapezoidal shape. The planar size of the opening 23 is set to be larger than the planar size of the information acquisition region 3.

The dimensions of the portions of the blocking layer 2 can be set as appropriate according to the embodiment. For example, in the peripheral edge portion 21, the widths of the portions that extend along the upper end side and the lower end side of the glass plate 1 may be set to be in a range of 20 mm to 100 mm, and the widths of the portions that extend along the left end side and the right end side may be set to be in a range of 15 mm to 70 mm. In addition, the size of the protruding portion 22 is set to be in a range of 200 mm (vertical)×100 mm (horizontal) to 400 mm (vertical)×200 mm (horizontal).

Moreover, the planar size of the information acquisition region 3 is determined depending on the information acquisition device installed inside the vehicle. By contrast, the planar size of the opening 23 may be set as appropriate so as to be larger than the planar size of the information acquisition region 3. For example, the opening 23 may be set as a trapezoidal region with an upper side of 85 mm, a lower side of 95 mm, and a height of 65 mm in a plan view.

The opening 23 is a region where the dark-colored ceramic constituting the blocking layer 2 is not layered. In other words, the dark-colored ceramic is not layered in this opening 23 and a region on the inner side in the in-plane direction with respect to the peripheral edge portion 21, and light can pass therethrough. As shown in FIG. 2, the camera 81 arranged on the vehicle interior side with respect to the glass plate 1 acquires information about the outside of the vehicle through the information acquisition region 3 within the opening 23. Therefore, the information acquisition region 3 may be configured such that the visible light transmittance is 70% or more, as defined in JIS R 3211 as described above, for example.

Similarly, the dark-colored ceramic is also not layered in the region on the inner side in the in-plane direction with respect to the peripheral edge portion 21, and light can pass therethrough. Passengers seated in the driver's seat and the passenger's seat in the automobile to which the windshield 100 is attached view the frontward vehicle exterior through the region on the inner side in the in-plane direction with respect to the peripheral edge portion 21. For this reason, the region on the inner side in the in-plane direction with respect to the peripheral edge portion 21 is configured to have visible light transmittance of an amount with which at least the traffic conditions of the vehicle exterior are visible.

In this embodiment, as shown in FIG. 4, the protruding portion 22 is constituted by an upper region 221 that is arranged on the upper side with respect to the opening 23, a lower region 222 that is located on the lower side with respect to the upper region 221 and in which the opening 23 is formed, and a rectangular lateral region 223 that is formed in a lateral portion of the lower region 222. The protruding portion 22 has a layered structure as shown in FIG. 5.

That is, the upper region 221 is constituted by a single layer, namely a first ceramic layer 241 made of a dark-colored ceramic. The lower region 222 is constituted by three layers that are layered on the inner surface of the glass plate 1, namely the above-mentioned first ceramic layer 241, a silver layer 242, and a second ceramic layer 243. The silver layer 242 is made of silver, and the second ceramic layer 243 is made of the same material as the material of the first ceramic layer 241.

The lateral region 223 is constituted by the first ceramic layer 241 and the silver layer 242, which are layered on the inner surface of the glass plate 1, and the silver layer 242 is exposed to the vehicle interior side. The first ceramic layer 241, which is the undermost layer, is shared by all of the regions, and the silver layer 242, which is the second layer, is shared by the lower region 222 and the lateral region 223.

It should be noted that, as described later, a bracket to which the cover of the camera 81 is to be attached is bonded, using an adhesive, to the protruding portion 22 formed on the surface on the vehicle interior side of the inner glass plate 12. If a urethane-silicone-based adhesive is used for this purpose, for example, there is a risk that the adhesive may deteriorate due to ultraviolet rays or the like. Therefore, it is preferable that the thicknesses of the ceramic layers (241, 243) are set to 20 µm to 50 µm, for example, from the viewpoint of ensuring light blocking properties and preventing the deterioration of the adhesive. Moreover, it is preferable that the thickness of the silver layer 242 is set to 20 µm to 50 µm, for example. Therefore, it is preferable that the thickness D1 of the lower region 222 of the protruding portion 22 is set to 60 µm to 150 µm, for example.

The blocking layer 2 including the peripheral edge portion 21 and the protruding portion 22 as mentioned above can be formed as described below, for example. First, the first ceramic layer 241 is applied to the glass plate. The first ceramic layer 241 is shared by the peripheral edge portion 21 and the protruding portion 22. Next, the silver layer 242 is applied to the regions corresponding to the lower region 222 and the lateral region 223 on the first ceramic layer 241. Lastly, the second ceramic layer 243 is applied to the region corresponding to the lower region 222 on the silver layer 242.

It should be noted that the silver layer 242, which is exposed in the lateral region 223, is provided with wiring for grounding. Although the ceramic layers (241, 243) and the silver layer 242 can be formed using a screen printing process, these layers can also be produced, in addition, by transferring a transfer film for firing to the glass plate and firing it. Configuring the lower region 222 in this manner such that the silver layer 242 is included makes it possible to block electromagnetic waves and thereby prevent the camera 81, which is attached via the bracket 6 fixed to the lower region 222, from being affected by electromagnetic waves.

Materials of the ceramic layers (241, 243) may be selected as appropriate according to the embodiment. The ceramic layers (241, 243) can be made of ceramic with a dark color such as black, brown, gray, or dark blue, for example. Specifically, the ceramic layers (241, 243) can be made of ceramic having a composition shown in Table 1 below. However, the composition of the ceramic constituting the ceramic layers (241, 243) is not limited to that shown in Table 1 below, and may be selected as appropriate according to the embodiment.

TABLE 1

|  |  | Ceramic paste |
| --- | --- | --- |
| Pigment *1 | mass % | 10% |
| Resin (cellulose resin) | mass % | 5% |
| Organic solvent (pine oil) | mass % | 15% |
| Glass binder *2 | mass % | 70% |
| Viscosity | dPs | 150 |

*1: Black 6350 (Pigment Green 17) manufactured by Asahi Kasei Kogyo Co., Ltd.
*2: Main components: bismuth borosilicate, zinc borosilicate Moreover, a material of the silver layer 242 may also be selected as appropriate according to the embodiment. The material having a composition shown in Table 2 below can be used for the silver layer 242, for example.

TABLE 2

|  |  | Conductive ceramic paste |
| --- | --- | --- |
| Silver particles (average particle diameter: 10 µm) | mass % | 70 |
| Glass binder *1 | mass % | 10 |
| Resin (cellulose resin) | mass % | 5 |
| Organic medium (terpineol) | mass % | 15 |
| Viscosity | dPs | 180 |

*1: Main components: bismuth borosilicate, zinc borosilicate

The screen printing can be performed under the conditions that a polyester screen of 355 mesh is used, the coating thickness is 20 µm, the tension is 20 Nm, the squeegee hardness is 80 degrees, the attachment angle is 75°, and the printing speed is 300 mm/s, for example, and the ceramic layers (241, 243) and the silver layer 242 can be formed by performing drying in a drying furnace at 150° C. for 10 minutes. It should be noted that when the first ceramic layer 241, the silver layer 242, and the second ceramic layer 243 are layered in this order, it is sufficient that the above-described screen printing and drying are repeated.

Antifog Film

Next, the antifog film 4 will be described. As shown in FIG. 2, the antifog film 4 is formed with a rectangular cross section and includes a sheet-like heat blocking layer 42, an antifog layer 43 layered on one surface of the heat blocking layer 42, and a transparent sticky layer 41 layered on the other surface of the heat blocking layer 42. The antifog film 4 is attached to the surface on the vehicle interior side of the information acquisition region 3, namely the surface on the vehicle interior side of the inner glass plate 12, via the sticky layer 41 with the other surface of the heat blocking layer 42 facing that surface. Hereinafter, the layers will be described.

(A) Antifog Layer

First, the antifog layer 43 will be described. The antifog layer 43 is arranged as the outermost layer of the antifog film 4 and exhibits the antifog function. The type of antifog layer 43 need not be particularly limited as long as it has antifog properties, and known antifog layers can be used. In general, the types of antifog layer include a hydrophilic type that turns water generated from water vapor into a water layer on its surface, a water absorbent type that absorbs water vapor, and a water repellent type that repels waterdrops generated from water vapor. All these types can be used as the antifog layer 43.

When the water absorbent type is employed, the antifog layer 43 can be configured as described below, for example. That is, the antifog layer 43 can be configured to include a water repellent group and a metallic oxide component, and to preferably further include a water absorbent resin. The antifog layer 43 may further include other functional components as needed. There is no limitation on the type of water absorbent resin as long as a resin that can absorb and hold water is used. The antifog layer 43 can be supplied with a water repellent group using a metallic compound containing a water repellent group (water repellent group-containing metallic compound). The antifog layer 43 can be supplied with a metallic oxide component using a metallic compound other than the water repellent group-containing metallic compound, minute particles of a metallic oxide, or the like. Hereinafter, these components will be described.

Water Absorbent Resin

First, the water absorbent resin will be described. The antifog layer 43 can contain, as the water absorbent resin, at least one type of polymer selected from the group consisting of urethane resin, epoxy resin, acrylic resin, polyvinyl acetal resin, and polyvinylalcohol resin. An example of the urethane resin is polyurethane resin constituted by polyisocyanate and polyol. Acrylic polyol and polyoxyalkylene-based polyol are preferable as the polyol. Examples of the epoxy resin include glycidyl ether-based epoxy resin, glycidyl ester-based epoxy resin, glycidyl amine-based epoxy resin, and cyclic aliphatic epoxy resin. The cyclic aliphatic epoxy resin is preferable. Hereinafter, the polyvinyl acetal resin (referred to merely as "polyacetal" hereinafter), which is a preferable water absorbent resin, will be described.

Polyvinyl acetal can be obtained by acetalizing an aldehyde with polyvinyl alcohol through a condensation reaction. It is sufficient that the acetalization using polyvinyl alcohol is performed using a known method such as a precipitation method in which an aqueous medium is used in the presence of an acid catalyst, or a dissolution method in which a solvent such as alcohol is used. The acetalization can be performed in parallel with the saponification of polyvinyl acetate. The degree of acetalization is preferably 2 to 40 mol %, more preferably 3 to 30 mol %, and even more preferably 5 to 20 mol %, and optionally 5 to 15 mol %. The degree of acetalization can be measured based on $^{13}C$ nuclear magnetic resonance spectroscopy, for example. Polyvinyl acetal whose degree of acetalization is within the above-mentioned range is suitable for forming an antifog layer having favorable water absorbing properties and water resistance.

The average degree of polymerization of the polyvinyl alcohol is preferably 200 to 4500, and more preferably 500 to 4500. A high average degree of polymerization is advantageous in the formation of an antifog layer having favorable water absorbing properties and water resistance, but if the average degree of polymerization is excessively high, the viscosity of the solution will become excessively high, and the formation of an antifog layer may be negatively affected. A favorable degree of saponification of the polyvinyl alcohol is 75 to 99.8 mol %.

Examples of the aldehyde condensed with polyvinyl alcohol through a condensation reaction include aliphatic aldehydes such as formaldehyde, acetaldehyde, butyraldehyde, hexylcarbaldehyde, octylcarbaldehyde, and decylcarbaldehyde. Examples thereof also include aromatic aldehydes including benzaldehyde; benzaldehyde subjected to substitution using an alkyl group such as 2-methylbenzaldehyde, 3-methylbenzaldehyde, 4-methylbenzaldehyde, or the like; benzaldehyde subjected to substitution using a halogen atom such as chlorobenzaldehyde or the like; substituted benzaldehyde in which a hydrogen atom is substituted with a functional group such as a hydroxy group, an alkoxy group, an amino group, or a cyano group, other than alkyl groups; and condensed aromatic aldehyde such as naphtaldehyde or anthraldehyde. Aromatic aldehydes, which are highly hydrophobic, are advantageous in the formation of an antifog layer with a low degree of acetalization and excellent water resistance. Use of aromatic aldehydes is also advantageous in that an antifog layer having high water absorbency is formed while a large number of hydroxy groups are caused to remain. It is preferable that the polyvinyl acetal has an acetal structure derived from an aromatic aldehyde, particularly benzaldehyde.

The content of the water absorbent resin (polymer) in the antifog layer 43 is preferably 50 mass % or more, more preferably 60 mass % or more, and even more preferably 65 mass % or more, and preferably 99 mass % or less, more preferably 90 mass % or less, and even more preferably 85 mass % or less, from the viewpoint of hardness, water absorbing properties, and antifog properties. This makes it possible to make it relatively likely that the antifog layer 43 thermally expands compared with a case where only hydrophilic inorganic materials are used. Accordingly, even if the heat blocking layer 42 is made of a material such as polyethylene or polyethylene terephthalate that is likely to thermally expand, it is possible to allow the antifog layer 43 to follow the thermally expanding heat blocking layer 42, and therefore, it is possible to make it less likely that the antifog film 4 will peel away from the information acquisition region 3. It should be noted that using a polymer as the main component as mentioned above may make the antifog layer 43 relatively soft. For example, there is a possibility that the pencil hardness of the antifog layer 43 will be 2H or less.

Water Repellent Group

Next, the water repellent group will be described. The water repellent group facilitates the realization of both strength and antifog properties of the antifog layer, and contributes to ensuring the straightness of incident light even if warterdrops are formed due to the hydrophobic surface of the antifog layer. It is preferable to use a water repellent group, which has high water repellency, in order to sufficiently obtain the effect of the water repellent group. For example, the antifog layer 43 can contain at least one type of water repellent group selected from (1) chain or cyclic alkyl groups having 3 to 30 carbon atoms and (2) chain or cyclic alkyl groups having 1 to 30 carbon atoms in which at least a portion of hydrogen atoms are substituted with a fluorine atom (also referred to as "fluorine-substituted alkyl groups" hereinafter).

The chain or cyclic alkyl groups in (1) and (2) are preferably chain alkyl groups. The chain alkyl groups may be branched alkyl groups, but are preferably linear alkyl groups. Alkyl groups having more than 30 carbon atoms may lead to an antifog layer being opaque. The number of carbon atoms in the chain alkyl groups is preferably 20 or less from the viewpoint of the balance between the antifog properties, strength, and external appearance of the antifog layer. The chain alkyl groups have 1 to 8 or 4 to 16 carbon atoms, for example, and have preferably 4 to 8 carbon atoms. Particularly preferable alkyl groups are linear alkyl groups having 4 to 8 carbon atoms such as an n-pentyl group, an n-hexyl group, an n-heptyl group, and an n-octyl group. The fluorine-substituted alkyl groups in (2) may be groups obtained by substituting only a portion of hydrogen atoms of a chain or a cyclic alkyl group with a fluorine atom, or groups obtained by substituting all of the hydrogen atoms of a chain or a cyclic alkyl group with a fluorine atom, such as linear perfluoroalkyl groups. The fluorine-substituted alkyl groups have high water repellency, and therefore, the effects can be sufficiently obtained by adding a small amount thereof. It should be noted that, when the content of the fluorine-substituted alkyl groups is excessively large, a component containing the fluorine-substituted alkyl groups may be separated from the other components in a coating solution for forming an antifog layer.

Hydrolyzable Metallic Compound Containing Water Repellent Group

In order to blend the water repellent groups into the antifog layer 43, it is sufficient that a metallic compound containing a water repellent group, particularly a metallic compound (water repellent group-containing hydrolyzable metallic compound) containing a water repellent group and a hydrolyzable functional group or a halogen atom, or a hydrolysate thereof is added to a coating solution for forming an antifog layer. In other words, the water repellent group may be derived from the water repellent group-containing hydrolyzable metallic compound. A water repellent group-containing hydrolyzable silicon compound represented by Formula (I) below is preferably used as the water repellent group-containing hydrolyzable metallic compound.

$$R_m SiY_{4-m} \quad (I)$$

Here, R represents a water repellent group, that is, a chain or cyclic alkyl group having 1 to 30 carbon atoms in which at least a portion of hydrogen atoms is optionally substituted with a fluorine atom, and Y represents a hydrolyzable functional group or a halogen atom, and m represents an integer of 1 to 3. The hydrolyzable functional group is at least one type selected from an alkoxyl group, an acetoxy group, an alkenyloxy group, and an amino group, and preferably an alkoxy group, particularly an alkoxy group having 1 to 4 carbon atoms. An example of the alkenyloxy group is an isopropenoxy group. The halogen atom is preferably a chlorine atom. It should be noted that the functional groups shown here as examples can also be used as "hydrolyzable functional groups" described hereinafter. m is preferably 1 or 2.

When the progress of hydrolysis and polycondensation is completed, the compound represented by Formula (I) supplies a component represented by Formula (II) below.

$$R_m SiO_{(4-m)/2} \quad (II)$$

Here, R and m are as described above. In practice, after the hydrolysis and polycondensation have been performed, the compounds represented by Formula (II) form a network structure in which silicon atoms are linked to one another via oxygen atoms, in the antifog layer.

As described above, the compounds represented by Formula (I) are hydrolyzed or partially hydrolyzed, and at least portions thereof are polycondensed. Thus, a network structure including siloxane bonds (Si—O—Si) is formed in which silicon atoms and oxygen atoms are alternately linked and that spreads three-dimensionally. A water repellent group R is linked to the silicon atom contained in this network structure. In other words, the water repellent group R is immobilized in the network structure including siloxane bonds via an R—Si bond. This structure is advantageous in uniform dispersion of the water repellent groups R in the antifog layer. The network structure may contain silica components supplied from silicon compounds (e.g., tetraalkoxysilane and silane coupling agents) other than the water repellent group-containing hydrolyzable silicon compound represented by Formula (I). If a silicon compound that does not contain a water repellent group and contains a hydrolyzable functional group or halogen atom (water repellent group-free hydrolyzable silicon compound) is blended together with the water repellent group-containing hydrolyzable silicon compound in a coating solution for forming an antifog layer, a network structure including siloxane bonds containing silicon atoms that are linked to water repellent groups and silicon atoms that are not linked to water repellent groups can be formed. With such a structure, it is easy to independently adjust the content of the water repellent group and the content of the metallic oxide component in the antifog layer.

When the antifog layer contains a water absorbent resin, the water vapor permeability of the surface of the antifog layer containing a water absorbent resin is enhanced due to the water repellent groups, and the antifog performance is thus enhanced. The two functions, namely the water absorbent function and the water repellent function, are contrary to each other, and therefore, conventionally, a water absorbent material and a water repellent material are distributed in separate layers. However, the maldistribution of water near the surface of the antifog layer is resolved due to the water repellent groups contained in the antifog layer, so that the time it takes until dew condenses is prolonged, and the antifog properties of the antifog layer are thus enhanced. The following is a description of the effects.

Water vapor that has infiltrated the antifog layer containing the water absorbent resin forms hydrogen bonds with hydroxy groups in the water absorbent resin and the like, and is retained in the form of bound water. As the amount of water vapor increases, the form of water vapor changes from bound water to semibound water, and finally, water vapor is retained in the form of free water retained in voids in the antifog layer. The water repellent groups prevent the formation of hydrogen bonds and facilitate the dissociation of formed hydrogen bonds in the antifog layer. If the content of the water absorbent resin is the same, the number of hydroxy groups capable of forming a hydrogen bond in the antifog layer is the same, but the speed of hydrogen bond formation is reduced due to the water repellent groups. Therefore, if the antifog layer containing the water repellent groups is used, moisture will ultimately be retained in any of the above-mentioned forms in the antifog layer, but water vapor can diffuse to the bottom portion of the antifog layer as it is until it is retained therein. Moreover, water that is once retained dissociates relatively easily and is likely to move to the bottom portion of the antifog layer in the form of water vapor. As a result, the distribution of the retention amount of moisture in the thickness direction of the antifog layer is relatively uniform between the vicinity of the surface and the bottom portion of the antifog layer. That is, the entirety in the thickness direction of the antifog layer can be effectively used to absorb water supplied to the surface of the antifog layer, and therefore, waterdrops are less likely to be formed through condensation, thus resulting in the enhancement of antifog properties.

On the other hand, with a conventional antifog layer that does not contain the water repellent groups, water vapor that has infiltrated the antifog layer is retained significantly easily in the form of bound water, semibound water, or free water. Therefore, water vapor that has infiltrated the antifog layer tends to be retained in the vicinity of the surface of the antifog layer. As a result, in the antifog layer, the amount of moisture is extremely large in the vicinity of the surface, and rapidly decreases toward the bottom portion of the antifog layer. That is, although the bottom portion of the antifog layer can further absorb water, moisture saturates in the vicinity of the surface of the antifog layer and condenses into waterdrops, and therefore, the antifog properties are limited.

When the water repellent groups are introduced into the antifog layer using the water repellent group-containing hydrolyzable silicon compound (see Formula (I)), a network structure including stable siloxane bonds (Si—O—Si) is formed. The formation of this network structure is advantageous from the viewpoint that not only abrasion resistance but also hardness, water resistance, and the like are enhanced.

It is sufficient that the water repellent groups are added in an amount with which the contact angle of water on the surface of the antifog layer is 70° or more, preferably 80° or more, and even more preferably 90° or more. A measurement value obtained from 4 mg of a waterdrop dropped onto the surface of the antifog layer is taken as the contact angle of water. In particular, when a methyl group or ethyl group, which has slightly low water repellency, is used as the water repellent group, it is preferable to blend, into the antifog layer, the repellent groups in an amount with which the contact angle of water is within the above-mentioned range. The upper limit of the contact angle of water is not particularly limited, but is 150° or less, 120° or less, or 105° or less, for example. It is preferable that the water repellent groups are uniformly contained in the antifog layer such that the contact angle of water is within the above-mentioned range all over the region on the surface of the antifog layer.

Here, the relationship between the contact angle of water and the antifog layer 43 will be described with reference to FIGS. 6A and 6B. FIGS. 6A and 6B show states in which waterdrops (430, 431) that differ in contact angle attach to the antifog layers 43. As shown in FIGS. 6A and 6B, the areas of the antifog layer 43 covered with the waterdrops (430, 431) formed on the surface of the antifog layer 43 through condensation of the same amount of water vapor tend to decrease as the contact angle of water on the surface increases. The smaller the areas of the antifog layer 43 covered with the waterdrops (430, 431) are, the smaller the ratio of the areas in which light entering the antifog layer 43 diffuses is. Therefore, the antifog layer 43 in which the contact angle of water increases due to the presence of the water repellent groups is advantageous in that the straightness of transmitted light is maintained in a state in which waterdrops are formed on the surface of the antifog layer 43.

It is preferable that the antifog layer 43 contains the water repellent groups such that the contact angle of water is within the above-described preferable range. When the water absorbent resin is contained, it is preferable that the antifog layer 43 contains the water repellent groups such that the amount of water repellent groups is within a range of 0.05 parts by mass or more, preferably within a range of 0.1 parts by mass or more and more preferably within a range of 0.3 parts by mass or more, and within a range of 10 parts by mass or less and preferably within a range of 5 parts by mass or less, with respect to 100 parts by mass of the water absorbent resin.

Metallic Oxide Component

Next, the metallic oxide component will be described. The metallic oxide component is a component including an oxide of at least one type of element selected from Si, Ti, Zr, Ta, Nb, Nd, La, Ce, and Sn, for example, and is preferably a component including an oxide of Si (silica component). When the water absorbent resin is contained, it is preferable that the antifog layer 43 contains the metallic oxide component such that the amount of the metallic oxide component is preferably 0.01 parts by mass or more, preferably 0.1 parts by mass or more, more preferably 0.2 parts by mass or more, even more preferably 1 part by mass or more, even more preferably 5 parts by mass or more, optionally 7 parts by mass or more, and 10 parts by mass or more if necessary, with respect to 100 parts by mass of the water absorbent resin, and 60 parts by mass or less, particularly 50 parts by mass or less, preferably 40 parts by mass or less, more preferably 30 parts by mass or less, even more preferably 20 parts by mass or less, and optionally 18 parts by mass or less. The metallic oxide component is necessary for ensuring the strength of the antifog layer, particularly scratch resistance, but if the content of the metallic oxide component is excessively large, the antifog properties of the antifog layer are impaired.

At least a portion of the metallic oxide component may be derived from a hydrolyzable metallic compound or a hydrolysate thereof added to a coating solution for forming an antifog layer. Here, the hydrolyzable metallic compound is at least one selected from a) a metallic compound (water repellent group-containing hydrolyzable metallic compound) containing a water repellent group and a hydrolyzable functional group or a halogen atom, and b) a metallic compound that does not contain a water repellent group and contains a hydrolyzable functional group or halogen atom (water repellent group-free hydrolyzable metallic compound). The metallic oxide component derived from the compounds of a) and/or b) is an oxide of a metallic atom included in the hydrolyzable metallic compound. The metallic oxide component may include a metallic oxide component derived from minute particles of a metallic oxide added to a coating solution for forming an antifog layer, and a metallic oxide component derived from a hydrolyzable metallic compound or a hydrolysate thereof added to the coating solution. Also here, the hydrolyzable metallic compound is at least one compound selected from the compounds of a) and b) above. The compound of b) above, namely the hydrolyzable metallic compound containing no water repellent groups, may include at least one selected from tetraalkoxysilane and a silane coupling agent. Hereinafter, excluding the compound of a) above, which has been already described, the minute particles of a metallic oxide and the compound of b) above will be described.

Minute Particles of Metallic Oxide

The antifog layer 43 may further contain minute particles of a metallic oxide as at least a portion of the metallic oxide component. The metallic oxide constituting the minute particles of a metallic oxide is an oxide of at least one type of element selected from Si, Ti, Zr, Ta, Nb, Nd, La, Ce, and Sn, for example, and minute particles of silica are preferable. The minute particles of silica can be introduced into the antifog layer by adding colloidal silica thereto, for example. The minute particles of a metallic oxide excel at transmitting stress applied to the antifog layer to a transparent article that supports the antifog layer, and have high hardness. Therefore, the addition of the minute particles of a metallic oxide is advantageous from the viewpoint that the abrasion resistance and scratch resistance of the antifog layer are enhanced. Moreover, when the minute particles of a metallic oxide are added to the antifog layer, minute voids are formed in portions where the minute particles are in contact with one another or close to one another, and water vapor is likely to be introduced into the antifog layer through these voids. Accordingly, the addition of the minute particles of a metallic oxide may advantageously act to enhance the antifog properties. Minute particles of a metallic oxide that have been formed in advance are added to a coating solution for forming an antifog layer, and the minute particles of a metallic oxide can thus be supplied to the antifog layer.

When the average particle diameter of the minute particles of a metallic oxide is excessively large, the antifog layer may be opaque, whereas when the average particle diameter of the minute particles of a metallic oxide is excessively small, the minute particles aggregate, thus making it difficult to uniformly disperse the minute particles. From this viewpoint, the average particle diameter of the minute particles of a metallic oxide is preferably 1 to 20 nm, and particularly preferably 5 to 20 nm. It should be noted that the average particle diameter of the minute particles of a metal oxide in the form of primary particles is taken as the average particle diameter of the minute particles of a metallic oxide described herein. The average diameter of the minute particles of a metallic oxide is determined by measuring, through observation using a scanning electron microscope, the particle diameters of fifty randomly selected minute particles and employing the average value thereof. If the content of the minute particles of a metallic oxide is excessively large, there is a risk that the amount of water absorption will decrease in the entire antifog layer, and thus the antifog layer becomes opaque. When the antifog layer contains the water absorbent resin, it is preferable to add the minute particles of a metallic oxide such that the amount thereof is 0 to 50 parts by mass, preferably 1 to 30 parts by mass, more preferably 2 to 30 parts by mass, even more preferably 5 to 25 parts by mass, and optionally 10 to 20 parts by mass, with respect to 100 parts by mass of the water absorbent resin.

Hydrolyzable Metallic Compound Containing No Water Repellent Groups

In addition, the antifog layer 43 may contain a metallic oxide component derived from a metallic oxide compound that does not contain a water repellent group (water repellent group-free hydrolyzable compound). A preferable water repellent group-free hydrolyzable metallic compound is a hydrolyzable silicon compound that does not contain a water repellent group. The hydrolyzable silicon compound that does not contain a water repellent group is at least one type of silicon compound (it should be noted that a water repellent group is not contained) selected from silicon alkoxide, chlorosilane, acetoxysilane, alkenyloxysilane, and aminosilne, and silicon alkoxide that does not contain a water repellent group is preferable. It should be noted that an example of the alkenyloxysilane is isopropenoxysilane.

The hydrolyzable silicon compound that does not contain a water repellent group may be a compound represented by Formula (III) below.

As described above, Y represents a hydrolyzable functional group, and is preferably at least one selected from an alkoxyl group, an acetoxy group, an alkenyloxy group, an amino group, and a halogen atom.

The water repellent group-free hydrolyzable metallic compounds are hydrolyzed or partially hydrolyzed, and at least portions thereof are polycondensed. Thus, a metallic oxide component in which metallic atoms and oxygen atoms are linked is supplied. This component firmly joins the minute particles of a metallic oxide and the water absorbent resin, and may contribute to the enhancement of the abrasion resistance, hardness, water resistance, and the like of the antifog layer. When the antifog layer contains the water absorbent resin, it is preferable to set the amount of metallic oxide component derived from the hydrolyzable metallic compound that does not contain a water repellent group to be within a range of 0 to 40 parts by mass, preferably 0.1 to 30 parts by mass, more preferably 1 to 20 parts by mass, even more preferably 3 to 10 parts by mass, and optionally 4 to 12 parts by mass, with respect to 100 parts by mass of the water absorbent resin.

A preferable example of the hydrolyzable silicon compound that does not contain a water repellent group is tetraalkoxysilane, and more specifically, tetraalkoxysilane containing an alkoxy group having 1 to 4 carbon atoms. The tetraalkoxysilane is at least one selected from tetramethoxysilane, tetraethoxysilane, tetra-n-propoxysilane, tetraisopropoxysilane, tetra-n-butoxysilane, tetraisobutoxysilane, tetra-sec-butoxysilane, and tetra-tert-butoxysilane, for example.

If the content of the metallic oxide (silica) component derived from tetraalkoxysilane is excessively large, the antifog properties of the antifog layer may be impaired. One reason for this is that the flexibility of the antifog layer is impaired, and thus the swelling and shrinkage of the antifog layer caused by the absorption and discharge of moisture are limited. When the antifog layer contains the water absorbent resin, it is preferable to add the metallic oxide component derived from tetraalkoxysilane such that the amount thereof is within a range of 0 to 30 parts by mass, preferably 1 to 20 parts by mass, and more preferably 3 to 10 parts by mass, with respect to 100 parts by mass of the water absorbent resin.

Another preferable example of the hydrolyzable silicon compound that does not contain a water repellent group is a silane coupling agent. The silane coupling agent is a silicon compound containing active functional groups that are different from each other. It is preferable that a portion of the active functional groups are hydrolyzable functional groups. An example of the silane coupling agent is a silicon compound containing an epoxy group and/or an amino group and a hydrolyzable functional group. Preferable examples of the silane coupling agent include glycidyloxyalkyltrialkoxysilane and aminoalkyltrialkoxysilane. It is preferable that, in these silane coupling agents, an alkylene group that is directly linked to a silicon atom has 1 to 3 carbon atoms. Since a glycidyloxyalkyl group and an aminoalkyl group contain a hydrophilic functional group (epoxy group, amino group), they are not water-repellent as a whole even though they contain an alkylene group.

The silane coupling agent firmly couples water absorbent resin, which is an organic component, and the minute particles of a metallic oxide and the like, which are inorganic components, and may contribute to the enhancement of the abrasion resistance, hardness, water resistance, and the like of the antifog layer. However, when the content of the metallic oxide (silica) component derived from the silane coupling agent is excessively large, the antifog properties of the antifog layer is impaired, and the antifog layer may be opaque in some cases. When the antifog layer contains the water absorbent resin, it is preferable to add the metallic oxide component derived from the silane coupling agent such that the amount thereof is within a range of 0 to 10 parts by mass, preferably 0.05 to 5 parts by mass, and more preferably 0.1 to 2 parts by mass, with respect to 100 parts by mass of the water absorbent resin.

Cross-Linked Structure

In addition, the antifog layer 43 may also include a cross-linked structure formed using a cross-linking agent, preferably at least one type of cross-linking agent selected from an organic boron compound, an organic titanium compound, and an organic zirconium compound. The introduction of the cross-linked structure enhances the abrasion resistance, scratch resistance, and water resistance of the antifog layer. From another viewpoint, the introduction of the cross-linked structure facilitates the improvement of the durability of the antifog layer without impairing the antifog properties.

When the cross-linked structure formed using a cross-linking agent is introduced into the antifog layer in which the metallic oxide component is a silica component, the antifog layer may contain a metallic atom other than silicon, preferably boron, titanium, or zirconium, in addition to silicon, as metallic atoms.

There is no particular limitation on the type of cross-linking agent as long as the used water absorbent resin can be cross-linked. Here, only examples of the organic titanium compound will be listed. The organic titanium compound is at least one selected from a titanium alkoxide, a titanium chelate-based compound, and titanium acylate, for example. Examples of the titanium alkoxide include titanium tetraisopropoxide, titanium tetra-n-butoxide, and titanium tetraoctoxide. Examples of the titanium chelate-based compound include titanium acetylacetonate, titanium ethyl acetoacetate, titanium octyleneglycol, titanium triethanolamine, and titanium lactate. The titanium lactate may be an ammonium salt thereof (titanium lactate ammonium). An example of the titanium acylate is titanium stearate. A preferable organic titanium compound is a titanium chelate compound, particularly titanium lactate.

When the water absorbent resin is polyvinyl acetal, a preferable cross-linking agent is an organic titanium compound, particularly titanium lactate.

Other Optional Components

Other additives may also be blended into the antifog layer 43. Examples of the additives include glycols such as glycerin and ethylene glycol that have the function of improving the antifog properties. A surfactant, a leveling agent, an ultraviolet absorbing agent, a coloring agent, an antifoaming agent, an antiseptic agent, and the like may be used as the additives. Blending a surfactant into the material of the antifog layer 43 makes it likely that a liquid agent spreads on the heat blocking layer 42 when the antifog layer 43 is formed by applying the liquid agent onto the heat blocking layer 42. Therefore, it is possible to make it less likely that the surface of the formed antifog layer 43 becomes uneven. Therefore, it is possible to suppress warping of the antifog layer 43. Accordingly, an antifog film that is suitable for being attached to the information acquisition region 3 can be provided. It should be noted that examples of the surfactant include BYK-323, BYK-333, BYK-342, BYK-377, and BYK-3455, which are manufactured by BYK; KP-109, KP-110, and KP-112, which are manufactured by Shin-Etsu Chemical Co., Ltd.; and TSF4440, TSF4452, and TSF4450, which are manufactured by Momentive.

As is clear from the description above, a preferable embodiment of the antifog layer 43 has a configuration as described below. That is, it is preferable that the antifog layer 43 contains 0.1 to 60 parts by mass of the metallic oxide component and 0.05 to 10 parts by mass of the water repellent groups, with respect to 100 parts by mass of the water absorbent resin. At this time, the water repellent groups may be chain alkyl groups having 1 to 8 carbon atoms and be directly linked to metallic atoms included in the metallic oxide component, and the metallic atoms may be silicon atoms. Moreover, at least a portion of the metallic oxide component may be a hydrolyzable metallic compound derived from a hydrolyzable metallic compound or a hydrolysate of the hydrolyzable metallic compound that is added to a coating solution for forming an antifog layer, and the hydrolyzable metallic compound may be at least one selected from a hydrolyzable metallic compound that contains a water repellent group and a hydrolyzable metallic compound that does not contain a water repellent group. Furthermore, the hydrolyzable metallic compound that does not contain a water repellent group may include at least one selected from tetraalkoxysilane and silane coupling agents. Configuring the antifog layer 43 as described above makes it possible to suppress fog on the information acquisition region 3, and thus the camera 81 can appropriately acquire information about the outside of a vehicle.

An example of the above-described antifog layer 43 can be obtained as follows. First, 87.5 mass % of a solution containing a polyvinyl acetal resin ("S-LEC KX-5" manufactured by Sekisui Chemical Co., Ltd.; a solid content is 8 mass %, the degree of acetalization is 9 mol %, and an acetal structure derived from benzaldehyde is included), 0.526 mass % of n-hexyltrimethoxysilane (HTMS, "KBM-3063" manufactured by Shin-Etsu Chemical Co., Ltd.), 0.198 parts by mass of 3-glycidoxypropyltrimethoxysilane (GPTMS, "KBM-403" manufactured by Shin-Etsu Chemical Co., Ltd.), 2.774 mass % of tetraethoxysilane (TEOS, "KBE-04" manufactured by Shin-Etsu Chemical Co., Ltd.), 5.927 mass % of an alcohol solvent ("Solmix AP-7" manufactured by Alcohol Trading Co., Ltd.), 2.875 mass % of purified water, 0.01 mass % of hydrochloric acid serving as an acid catalyst, and 0.01 mass % of a leveling agent ("KP-341" manufactured by Shin-Etsu Chemical Co., Ltd.) are placed in a glass container, and stirred at room temperature (25° C.) for 3 hours. A coating solution for forming the antifog layer 43 can thus be prepared.

(B) Heat Blocking Layer and Gluing Agent Layer

Next, the heat blocking layer 42 and the sticky layer 41 will be described. The substrate layer 42 serves as a substrate for the antifog film 4, and the antifog layer 43 and the sticky layer 41 are respectively held on its two surface sides. Moreover, the sticky layer 41 serves to bond the antifog film 4 to a subject. The materials of the sticky layer 41 may be selected as appropriate according to the embodiment as long as the materials are transparent materials with which the antifog film 4 can be attached to the surface on the vehicle interior side of the information acquisition region 3. For example, the sticky layer 41 can be formed of an acrylic adhesive or a silicone adhesive.

The materials of the heat blocking layer 42 may be selected as appropriate according to the embodiment as long as the dissipation of heat from the inside of the vehicle toward the outside of the vehicle can be blocked. For example, the heat blocking layer 42 can be formed of a transparent resin sheet made of polyethylene, polyethylene terephthalate, or the like. It should be noted that the heat blocking layer 42 is preferably made of a material having a thermal conductivity of $5 \times 10^{-4}$ cal/cm·sec·° C. or less. This makes it possible to sufficiently ensure the heat blocking properties of the heat blocking layer 42. It should be noted that examples of a material that satisfies such a condition include COSMOSHINE A4300 (TOYOBO Co., Ltd.) and Lumirror (TORAY INDUSTRIES Inc.).

(C) Manufacturing Method

Next, a method for manufacturing an antifog film 4 as mentioned above will be described. The antifog film 4 can be manufactured by forming the antifog layer 43 on one surface of the heat blocking layer 42 and applying a gluing agent on the other surface to form the sticky layer 41.

The antifog layer 43 can be formed by applying a coating solution (liquid agent) for forming the antifog layer 43 onto the heat blocking layer 42, drying the heat blocking layer 42 onto which the coating solution has been applied, and further performing high-temperature and high-humidity treatment or the like as needed. It is sufficient that conventionally known materials and methods are respectively used as the solvent to be used for the preparation of the coating solution and a method for applying the coating solution.

In the step of applying the coating solution, the atmosphere is preferably kept at a relative humidity of lower than 40%, and more preferably 30% or lower. Keeping the atmosphere at a low relative humidity makes it possible to prevent the film from absorbing an excessive amount of moisture from the atmosphere. If a large amount of moisture is absorbed from the atmosphere, there is a risk that water that will enter and remain in the matrix of the film and cause the strength of the film to deteriorate.

It is preferable that the step of drying the heat blocking layer onto which the coating solution has been applied includes an air-drying step and a heat-drying step for performing drying by heating. It is preferable to perform the air-drying step by exposing the coating solution to the atmosphere maintained at a relative humidity of lower than 40%, and more preferably 30% or lower. The air-drying step can be performed as a non-heating step. In other words, it can be performed at room temperature. When the coating solution contains a hydrolyzable silicon compound, in the heat-drying step, dehydration in which hydroxy groups present in silanol groups contained in the hydrolysates of silicon compounds and on a transparent article are involved progresses, and a matrix structure (network of Si—O bonds) including silicon atoms and oxygen atoms develops.

In order to prevent the decomposition of organic substances such as the water absorbent resin, it is preferable that the temperature applied in the heat-drying step is not excessively high. In this case, an appropriate heating temperature is 300° C. or lower (e.g., 100 to 200° C.), and the heating time is 1 minute to 1 hour.

A high-temperature and high-humidity treatment step may by performed as appropriate during the formation of the antifog layer 43. Performing the high-temperature and high-humidity treatment step may further facilitate the realization of both the antifog properties and the strength of the film. The high-temperature and high-humidity treatment step can be performed by holding the heat blocking layer in the atmosphere at 50 to 100° C. at a relative humidity of 60 to 95% for 5 minutes to 1 hour. The high-temperature and high-humidity treatment step may be performed after the application step and the drying step, or after the application step and the air-drying step and before the heat-drying step. In particular, in the former case, a heat-treatment step may be additionally performed after the high-temperature and high-humidity treatment step. This additional heat-treatment step can be performed by holding the heat blocking layer in the atmosphere at 80 to 180° C. for 5 minutes to 1 hour.

The antifog layer 43 made of the coating solution may be washed and/or wiped with a moist cloth as needed. Specifically, this can be performed by exposing the surface of the antifog layer 43 to a stream of water or wiping it with a cloth containing water. Pure water is suitable as the water used in these steps. It is preferable to avoid using a solution containing a detergent for washing. With this step, dust, dirt, and the like attaching to the surface of the antifog layer 43 are removed, and a clean coating surface can thus be obtained.

(D) Thicknesses of Layers

Next, the thicknesses of the layers will be described. The thicknesses of the layers may be set as appropriate according to the embodiment. For example, the thickness of the sticky layer 41 may be set to be within a range of several micrometers to several hundred micrometers.

As shown in the example in FIG. 2, a thickness D2 of the heat blocking layer 42 can be set to be larger than a thickness D1 of the blocking layer 2. If the thickness D2 is reduced, the antifog film 4 will be excessively soft, which may make it difficult to attach the antifog film 4 to the glass plate 1. On the other hand, if the thickness D2 is increased, the antifog film 4 cannot be made thinner. From this viewpoint, it is possible to set the thickness D2 of the heat blocking layer 42 to be within a range of 75 μm to 150 μm, for example. At this time, the thickness D2 of the heat blocking layer 42 is preferably 75 μm or more, and more preferably 100 μm or more, from the viewpoint of blocking heat exchange. The thickness D1 of the blocking layer 2 may be set to be smaller than the thickness D2 as appropriate.

When the thickness D2 of the heat blocking layer 42 is made larger than the thickness D1 of the blocking layer 2, the upper surface of the antifog film 4 can be arranged at a position higher than the upper surface of the blocking layer 2 in the case where the glass plate 1 side is taken as the lower side as shown in the example in FIG. 2. Therefore, it is possible to prevent the blocking layer 2 from physically interfering while the antifog film 4 is being attached to the surface on the vehicle interior side of the information acquisition region 3, thus making it possible to easily attach the antifog film 4.

In addition, the thickness of the heat blocking layer 42 is relatively increased on the basis of the thickness D1 of the blocking layer 2, thus making it possible to sufficiently ensure the heat blocking properties of the heat blocking layer 42.

Moreover, a thickness D3 of the antifog layer 43 may be adjusted as appropriate according to required antifog performance and the like. For example, the thickness D3 of the antifog layer 43 can be set to be within a range of 1 μm to 20 μm, preferably a range of 2 μm to 15 μm, and more preferably a range of 3 μm to 10 μm.

(E) Shape and Planar Size

Next, the shape and planar size of the antifog film 4 will be described. As shown in the example in FIG. 4, in this embodiment, the antifog film 4 is formed in a rectangular shape in a plan view, and has four corner portions 46. The corner portions 46 are rounded. This makes it less likely that the antifog film 4 will peel away from the surface on the vehicle interior side of the information acquisition region 3.

Moreover, the planar size of the antifog film 4 is larger than the planar size of the information acquisition region 3 and smaller than the planar size of the opening 23 of the blocking layer 2. For example, the planar size of the antifog film 4 may be set to be smaller than the planar size of the opening 23 by 2 mm, for example, in both the vertical direction and the horizontal direction, and can be set to be within such a range.

As shown in the example in FIG. 4, this enables the antifog film 4 to fit in the opening 23, thus making it possible to prevent the antifog film 4 from straddling the step formed between the surface on the vehicle interior side of the information acquisition region 3 and the blocking layer 2 (protruding portion 22). Accordingly, the antifog film 4 can be easily attached to the information acquisition region 3, and it is possible to almost prevent gaps (air bubbles) that inhibit the camera 81 from acquiring information from being formed between the surface on the vehicle interior side of the information acquisition region 3 and the antifog film 4.

Moreover, as described above, the blocking layer 2 is made of a dark-colored ceramic or the like and thus may reach a high temperature (e.g., 105° C.). Therefore, even if only a portion of the antifog film 4 is attached to the blocking layer 2, it may be the case that the antifog film 4 is required to have high thermal resistance. By contrast, with this embodiment, the antifog film 4 can be attached to the information acquisition region 3 such that a portion thereof is not on the blocking layer 2. Accordingly, an antifog film with relatively low thermal resistance can also be used as the antifog film 4.

Furthermore, the heat blocking layer 42 is made of a material such as polyethylene or polyethylene terephthalate that is more likely to thermally expand than a glass plate 1. Therefore, making the planar size of the antifog film 4 smaller than the planar size of the opening 23 makes it possible to form a gap even in at least a partial region between the antifog film 4 and the edge of the opening 23 as shown in the examples in FIGS. 2 and 4. This makes it possible to prevent the antifog film 4 from expanding over the edge of the opening 23 and peeling away from the surface on the vehicle interior side of the information acquisition region 3 when the antifog film 4 thermally expands.

(F) Other Considerations

In this example, as shown in the examples in FIGS. 2 and 4, a portion of a right edge 231 of the opening 23 and a portion of a right edge 44 of the antifog film 4 are in contact with each other. As described above, arranging the antifog film 4 such that at least a portion of the edge of the opening 23 and at least a portion of the edge of the antifog film 4 are in contact with each other makes it possible to perform positioning using the edge of the opening 23 and the edge of the antifog film 4. Therefore, it is possible to attach the antifog film 4 to the information acquisition region 3 accurately and easily.

Moreover, in this embodiment, in addition to the camera 81 for taking images of the outside of the vehicle through the information acquisition region 3, a laser device configured to emit and/or receive a ray of light may also be arranged as an information acquisition device. When this laser device and the camera 81 are lined up in the horizontal direction, it is preferable to arrange the camera 81 on a side on which the edge 231 of the opening 23 and the edge 44 of the antifog film 4 are in contact with each other.

When the camera 81 and the laser device are compared, the angle of view, namely the information acquisition region 3, required for the camera 81 is wider than that required for the laser device. To address this, the edge 231 of the opening 23 and the edge 44 of the antifog film 4 are brought into contact with each other on the camera 81 side, thus making it possible to prevent a portion to which the antifog film 4 is not attached from entering the angle of view of the camera 81. In addition, it is possible to prevent a portion of the sticky layer 41 protruding from the edge 44 of the antifog film 4 from entering the angle of view of the camera 81 and thereby inhibiting the camera 81 from taking images.

Moreover, as shown in the examples in FIGS. 2 and 4, the planar size of the antifog film 4 is larger than the planar size of the information acquisition region 3, and therefore, a portion of the antifog film 4 protrudes toward the outside in the in-plane direction of the information acquisition region 3. Two attachment indication marks 45 for indicating that the antifog film 4 is attached are provided on this portion. The attachment indication marks 45 are opaque marks for indicating that the antifog film 4 is attached to the glass plate. These attachment indication marks 45 correspond to the "lamination indication marks" of the present invention. The attachment indication marks 45 can be formed by being printed on the heat blocking layer 42 using ink or the like, for example. Also, the attachment indication marks 45 may be formed not using ink or the like but through punching or the like.

Since the layers in the antifog film 4 are made of transparent materials, there is a case where the antifog film 4 attached to the surface on the vehicle interior side of the information acquisition region 3 cannot be confirmed. To address this, with this embodiment, providing the attachment indication marks 45 on the outer side in the in-plane direction of the information acquisition region 3 makes it possible to easily confirm that the antifog film 4 is attached to the surface on the vehicle interior side of the information acquisition region 3 while the camera 81 is not inhibited from acquiring information.

It should be noted that the number of attachment indication marks 45 need not be limited to two, and it may be one or three or more. Moreover, the type of the attachment indication marks 45 need not be limited to a circle shown in the example in FIG. 4, and the type may be selected from letters, figures, signs, and the like as appropriate according to the embodiment. Furthermore, the color of the attachment indication marks 45 may be selected as appropriate according to the embodiment as long as they can be visually confirmed.

Information Acquisition Device

Next, the camera 81 will be described. The camera 81 is an example of the information acquisition device arranged inside a vehicle. The camera 81 includes an image sensor such as a CCD (Charge Coupled Device) or a CMOS (Complementary MOS) and a lens system, and is configured so as to be capable of taking images of the conditions outside the vehicle through the information acquisition region 3.

Images acquired by the camera 81 are transmitted to an image processing device (not shown).

The image acquisition device analyzes the types of subjects and the like based on the images acquired by the camera 81. For example, the types of subjects can be presumed using a known image analysis method such as pattern recognition. The image processing device is constituted by a computer including a storage unit, a control unit, an input/output unit, and the like so as to be capable of performing such image analysis and presenting a user (driver) with the results. Such an image processing device may be a device designed exclusively for a service to be provided, or a general-purpose device such as a PC (Personal Computer) or a tablet terminal.

It should be noted that an information acquisition device other than the above-mentioned camera 81 can be arranged at a position that is opposite to the information acquisition region 3. For example, a laser device such as a radar may be arranged in parallel with the camera 81. This laser device is configured so as to be capable of emitting and/or receiving a ray of light. For example, the laser device includes a laser emitting element for emitting a laser beam, and a light receiving element for receiving reflected light, which is the laser beam reflected by an obstacle such as a preceding vehicle. The laser emitting element is constituted by a laser diode or the like, for example, so as to be capable of emitting a laser beam in a near infrared wavelength range of 850 nm to 950 nm. With this laser device, the distance from the obstacle to the subject vehicle can be calculated based on the time elapsed between when the laser beam is emitted and when the reflected light is received. The calculated distance is transmitted to an external device via a connector and used for controlling a brake of the vehicle and the like.

Bracket and Cover

Figure 7:
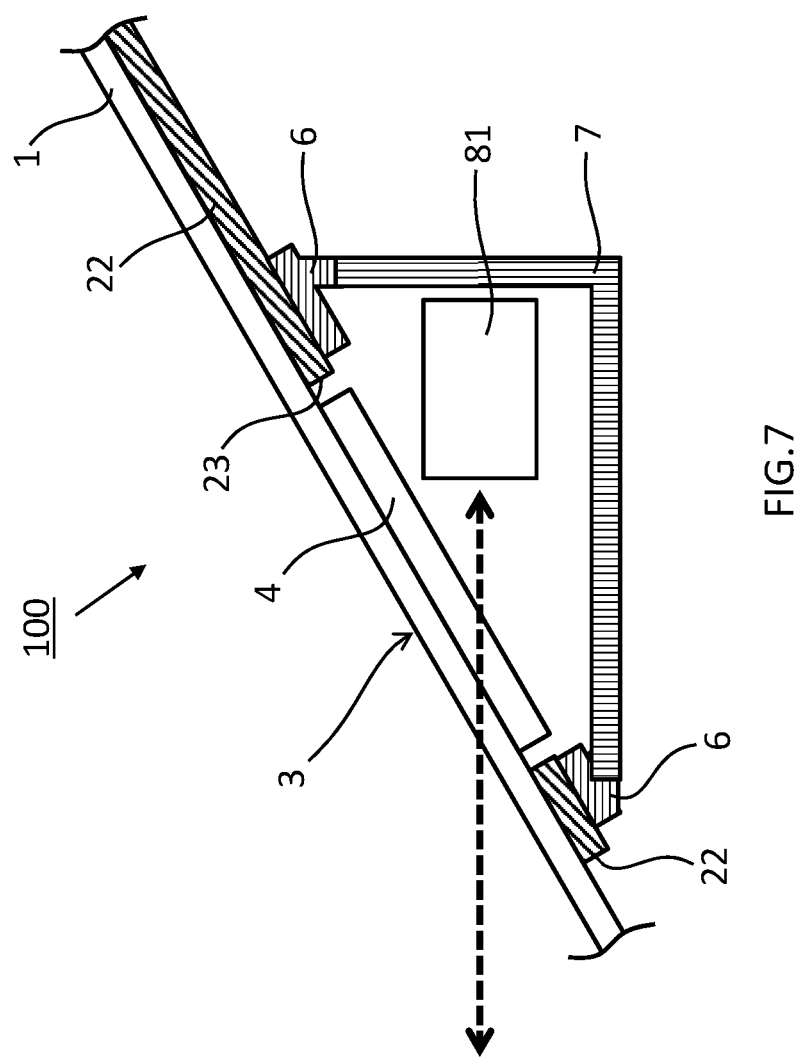
FIG. 7 schematically shows an example of a state in which a cover is attached to a bracket of the windshield according to the embodiment.
Figure 8A:
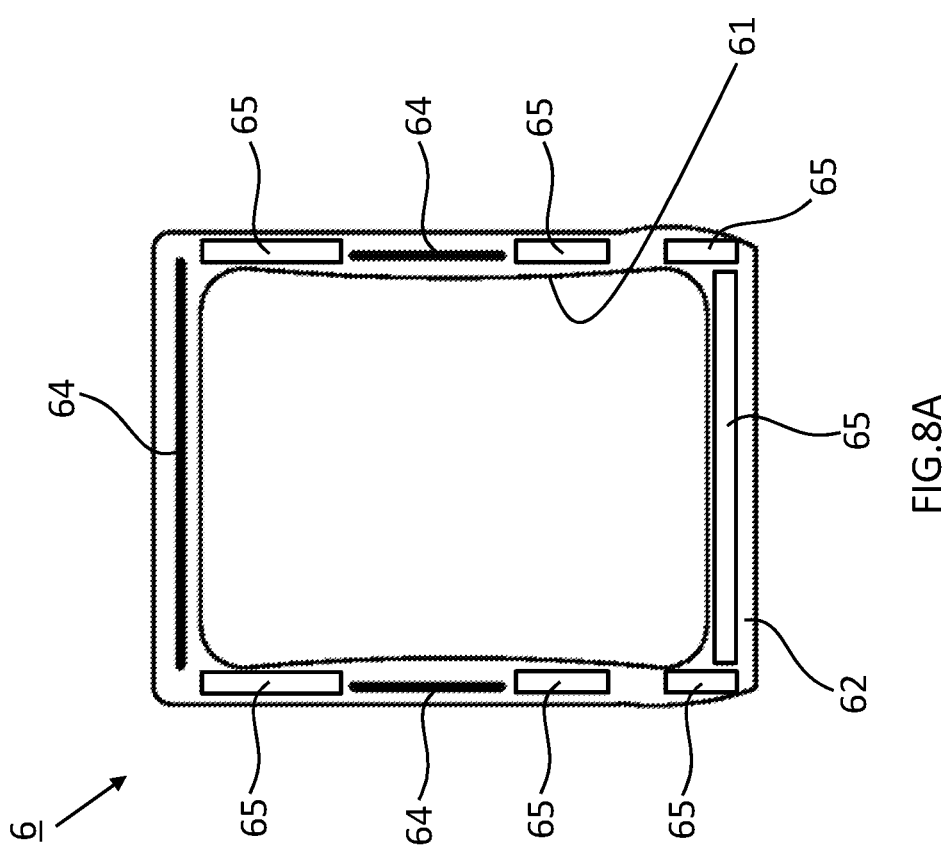
FIG. 8A schematically shows an example of a state on the vehicle exterior side of the bracket according to the embodiment.
Figure 8B:
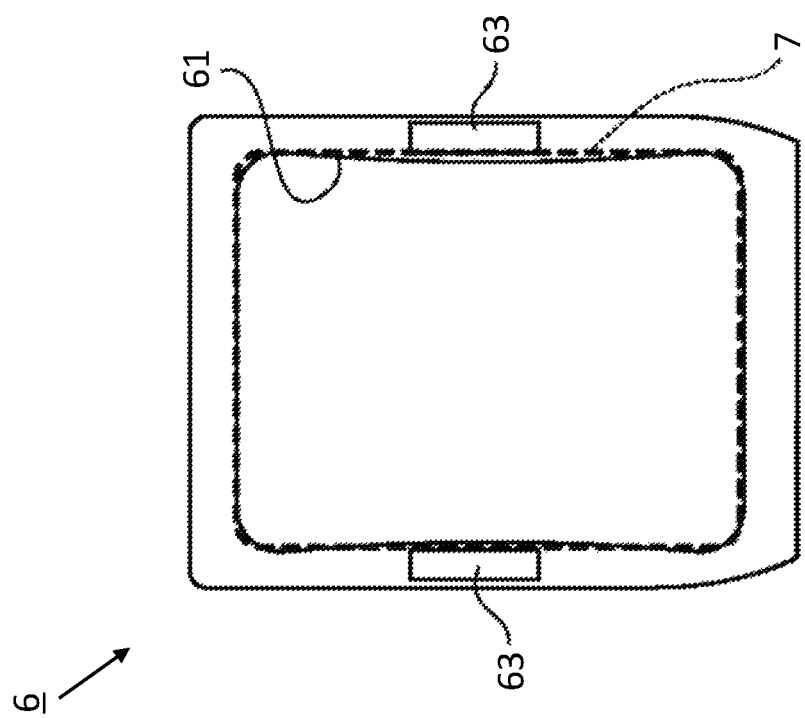
FIG. 8B schematically shows an example of a state on the vehicle interior side of the bracket according to the embodiment.
Figure 8C:
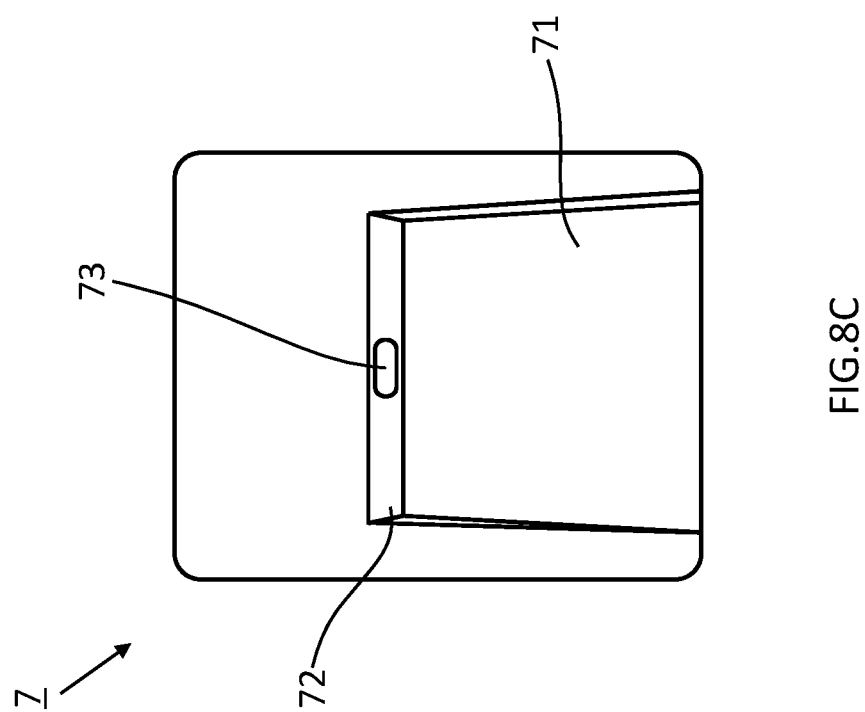
FIG. 8C schematically shows an example of the cover according to the embodiment.
Figure 9C:
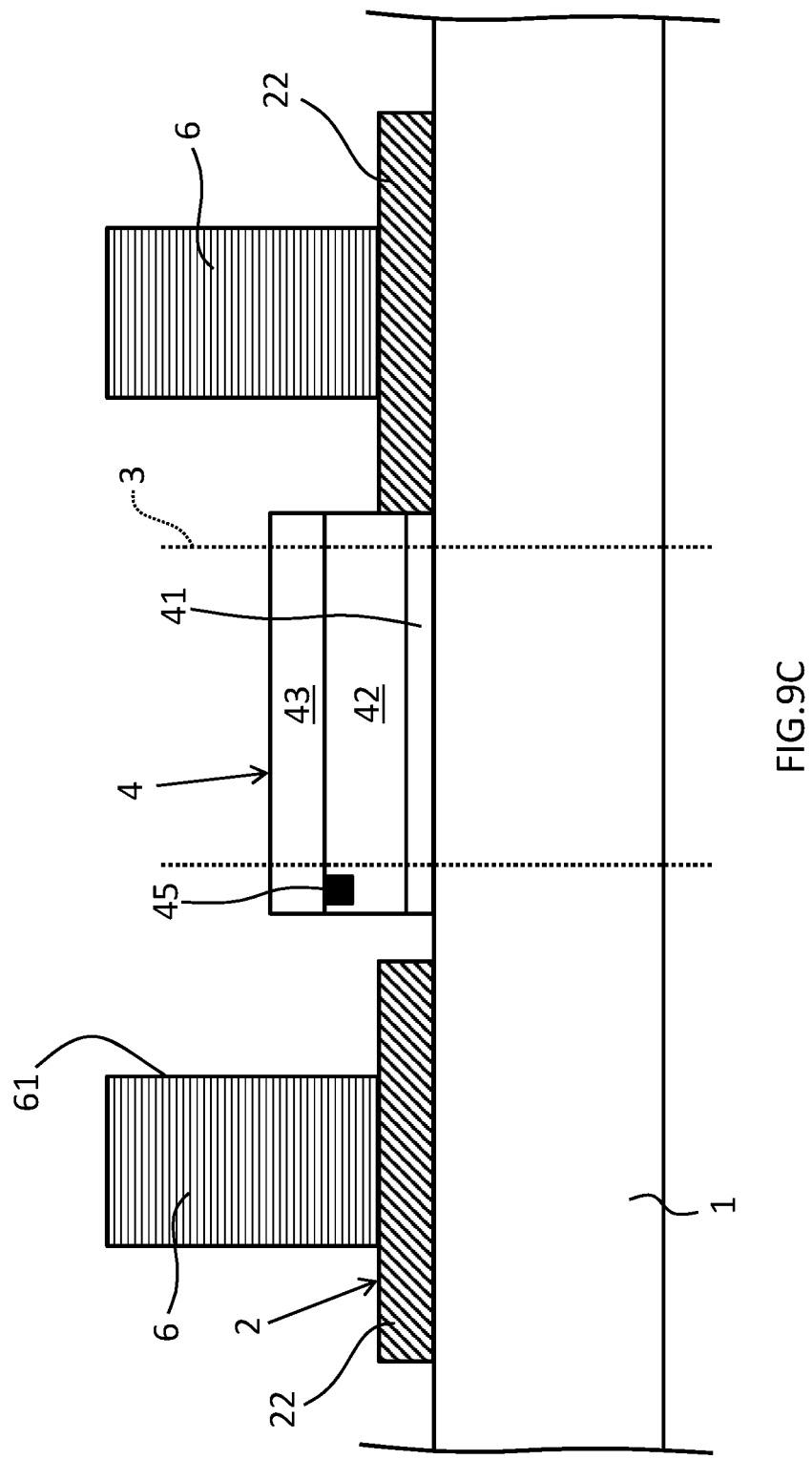
FIG. 9C schematically shows an example of the manufacturing process of the windshield according to the embodiment.
Figure 9D:
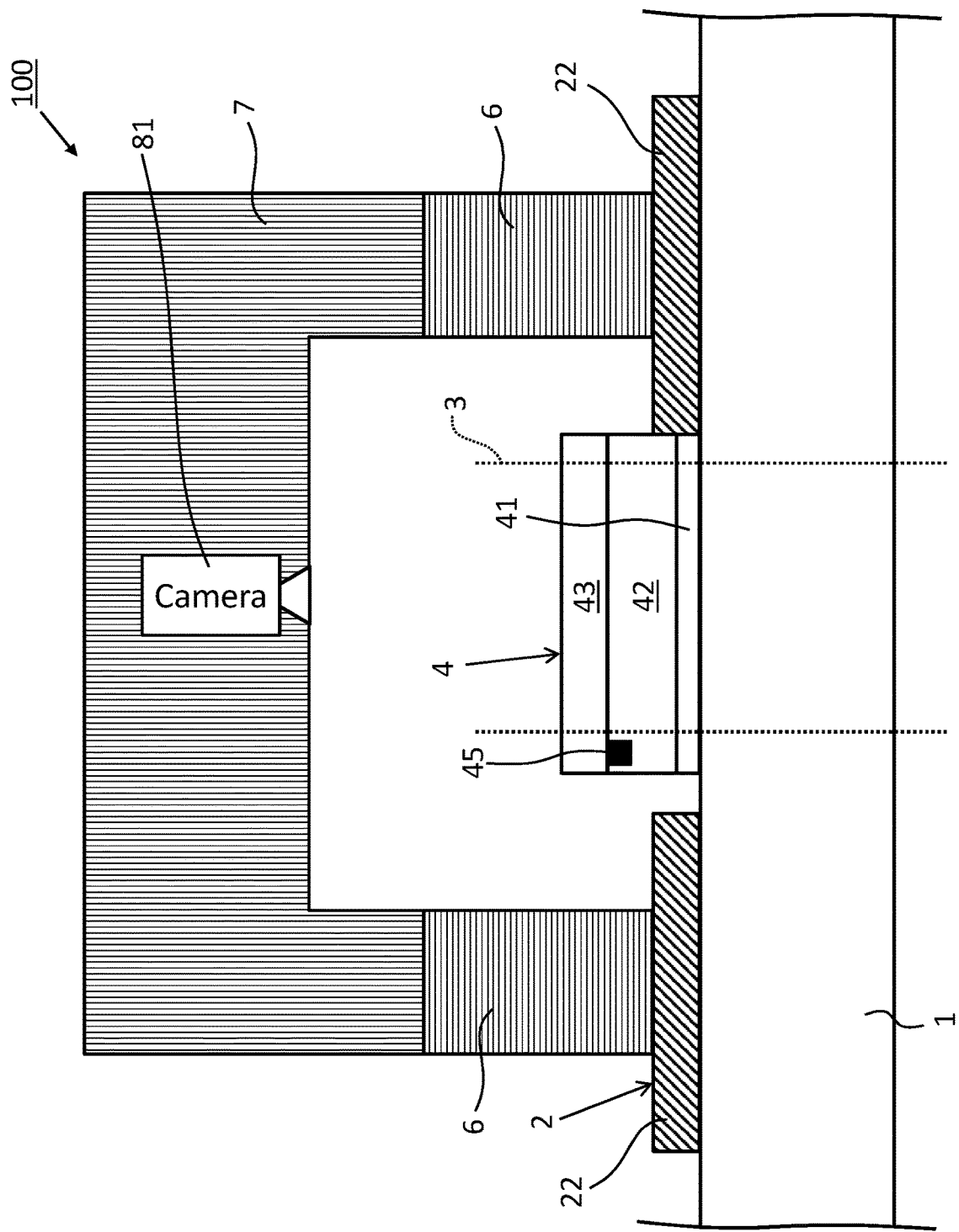
FIG. 9D schematically shows an example of the manufacturing process of the windshield according to the embodiment.

Next, the bracket 6 and the cover 7 for mounting the above-mentioned camera 81 to the windshield 100 will be described also referring to FIGS. 7 and 8A to 8C. FIG. 7 schematically shows an example of a state in which the bracket 6 and the cover 7 are attached to the windshield 100. FIG. 8A schematically shows an example of a state on the vehicle exterior side of the bracket 6 according to this embodiment. FIG. 8B schematically shows an example of a state on the vehicle interior side of the bracket 6 according to this embodiment. FIG. 8C schematically shows an example of the cover 7 according to this embodiment.

As shown in the examples in FIGS. 8A and 8B, in this embodiment, the bracket 6 is formed in a rectangular frame shape provided with an attachment opening 61 in which the cover 7 for holding the camera 81 is arranged. This bracket 6 includes a rectangular main body 62 surrounding the attachment opening 61, and supporting portions 63 that are arranged on two sides of the main body 62 and used to fix the cover 7.

As shown in FIGS. 1 and 7, the bracket 6 is arranged around the opening 23 of the blocking layer 2. A flat surface is formed on the main body 62, and an adhesive 64 and double-sided adhesive tape 65 are attached to this flat surface. The main body 62 is bonded to the blocking layer 2 (protruding portion 22) or the glass plate 1 using the adhesive 64 and the double-sided adhesive tape 65. Accordingly, the bracket 6 is fixed such that the entirety or at least a portion of the bracket 6 is blocked by the blocking layer 2 (protruding portion 22).

The types of the adhesive 64 and the double-sided adhesive tape 65 need not be particularly limited, and may be selected as appropriate according to the embodiment. For example, an adhesive such as a urethane resin adhesive or an epoxy resin adhesive can be used as the adhesive 64. Known double-sided adhesive tape can be used as the double-sided adhesive tape 65.

It should be noted that the arrangement of the adhesive 64 and the double-sided adhesive tape 65 shown in FIG. 8A is an example and need not be limited to this example. It should be noted that, in this embodiment, a region 232 on the lower side of the opening 23 is open. Accordingly, as shown in FIG. 8A, the bracket 6 can be visually confirmed from the vehicle exterior side through this portion, and therefore, it is preferable to use dark-colored double-sided adhesive tape 65 to make it difficult to visually confirm the bracket 6 from the outside of the vehicle.

After a harness (not shown) and the like are attached to the bracket 6, the cover 7 for holding the camera 81 is attached thereto from the vehicle interior side as shown in FIG. 7. Accordingly, the camera 81 is accommodated in a space surrounded by the bracket 6, the cover 7, and the glass plate 1.

As shown in FIG. 8C, the cover 7 is formed in a rectangular shape, is supported by the bracket 6 via the supporting portions 63, and is arranged so as to cover the attachment opening 61. In the housing of the cover 7, a surface that is opposite to the glass plate 1 via the attachment opening 61 is provided with a recessed portion 71. This recessed portion 71 is inclined such that the upper end is the deepest and the depth decreases toward the lower end. Lenses 73 of the camera 81 are arranged in a wall surface 72 at the upper end. The lenses 73 are positioned as appropriate so as to correspond to the information acquisition region 3 and the opening 23.

Therefore, when the cover 7 is attached to the bracket 6, the camera 81 is supported by the bracket 6 and the cover 7, and, in this state, the camera 81 can acquire information about the outside of the vehicle through the information acquisition region 3 (opening 23). It should be noted that light entering through the attachment opening 61 from the outside may have adverse influence on the camera 81 while it is taking images. Therefore, it is preferable that a light blocking member such as the adhesive 64 or double-sided adhesive tape 65 is provided so as to surround the recessed portion 71. It should be noted that the bracket 6 and the cover 7 may be produced as appropriate using a known processing method.

§ 2 Manufacturing Method

Figure 10:
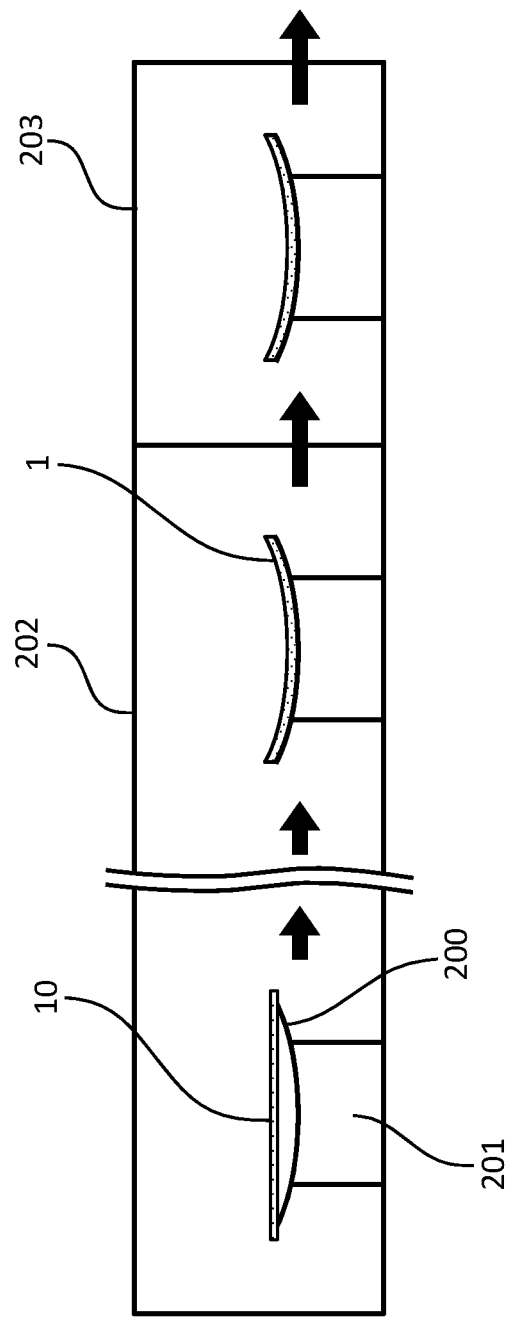
FIG. 10 schematically shows an example of the manufacturing process of the glass plate FIG. 11 schematically shows an example of a windshield according to another embodiment.

Next, a method for manufacturing the windshield 100 according to this embodiment will be described with reference to FIGS. 9A to 9D and 10. FIGS. 9A to 9D schematically show an example of a process for manufacturing the windshield 100 according to this embodiment. FIG. 10 shows an example of a process for manufacturing the glass plate 1 according to this embodiment. It should be noted that the method for manufacturing the windshield 100, which will be described below, is merely an example, and the steps may be changed where possible. Also, steps of the manufacturing process, which will be described below, can be omitted, replaced, and added as appropriate according to the embodiment.

First, in a first step, the glass plate 1 provided with the blocking layer 2 is prepared as shown in FIG. 9A. The glass plate 1 can be manufactured using a manufacturing line shown in the example in FIG. 10, for example. Specifically, the manufacturing line shown in the example in FIG. 10 includes an annular mold 200, a conveyance base 201 for conveying the mold 200, a heating furnace 202, and an annealing furnace 203.

Glass plates (11, 12) having a flat shape are prepared. Before being placed on the mold 200, the prepared glass plates (11, 12) are cut into a predetermined shape. Then, ceramic for forming the blocking layer 2 is printed (applied) onto the surface on the vehicle interior side of the inner glass plate 12 through screen printing or the like.

Next, the regions on which ceramic has been printed are dried as appropriate. A laminated glass 10 having a flat shape is formed by layering the outer glass plate 11 and the inner glass plate 12 such that the surface on the vehicle interior side of the outer glass plate 11 and the surface on the vehicle exterior side of the inner glass plate 12 face each other after the regions on which ceramic has been printed are dried. Then, the formed laminated glass 10 having a flat shape is placed on the mold 200. The mold 200 is arranged on the conveyance base 201, and the conveyance base 201 passes through the heating furnace 202 and the annealing furnace 203 in this order in the state in which the laminated glass 10 is placed on the mold 200.

When the glass plates (11, 12) are heated to a temperature near the softening point in the heating furnace 202, the inner portions with respect to the peripheral edge portions of the glass plates (11, 12) curve downward under their own weight, and thus the glass plates (11, 12) are molded into a curved shape. Subsequently, the glass plates (11, 12) are conveyed from the heating furnace 202 into the annealing furnace 203 and annealed. Then, the glass plates (11, 12) are conveyed from the annealing furnace 203 to the outside and allowed to cool.

After the glass plates (11, 12) are molded as described above, the interlayer 13 is sandwiched between the glass plates (11, 12), and a laminate in which the glass plates (11, 12) and the interlayer 13 are layered is thus produced. This laminate is placed into a rubber bag and preliminarily bonded together at about 70 to 110° C. under vacuum suction. A method for performing preliminary bonding may be selected as appropriate according to the embodiment.

Next, permanent bonding is performed. The preliminarily bonded laminate is permanently bonded using an autoclave at 8 to 15 atmospheres at 100 to 150° C., for example. Specifically, permanent bonding can be performed under the conditions of 14 atmospheres and 135° C., for example. The glass plates (11, 12) are bonded in the state in which the interlayer 13 is sandwiched therebetween through the preliminary bonding and permanent bonding as described above. The curved glass plate 1 provided with the blocking layer 2 with the opening 23 can thus be prepared.

Next, in a second step, the antifog film 4 is prepared. Then, as shown in FIG. 9B, the antifog film 4 is arranged such that the sticky layer 41 faces the surface on the vehicle interior side of the information acquisition region 3, and is then pressed against the surface on the vehicle interior side of the information acquisition region 3. For example, a tool such as a squeegee is used to manually or automatically press the antifog film 4 against the surface on the vehicle interior side of the information acquisition region 3. The antifog film 4 can thus be attached to the surface on the vehicle interior side of the information acquisition region 3.

At this time, when the antifog film 4 is attached to the correct position, the right edge 44 of the antifog film 4 is arranged to come into contact with the edge 231 of the opening 23. Therefore, when the second step is performed, the positioning of the antifog film 4 can also be performed by bringing the edge 44 of the antifog film 4 into contact with the edge 231 of the opening 23. Therefore, in this embodiment, the operations in the second step can thus be easily performed.

Moreover, in this embodiment, the thickness D2 of the heat blocking layer 42 of the antifog film 4 is larger than the thickness D1 of the blocking layer 2 (protruding portion 22). Therefore, in the case where the glass plate 1 side is taken as the lower side, the upper surface of the antifog film 4 is located at a position higher than the upper surface of the blocking layer 2, and therefore, the blocking layer 2 does not physically interfere while the antifog film 4 is being pressed using a tool such as a squeegee. Therefore, in this embodiment, this also makes it easy to perform the operations in the second step.

Next, in a third step, the bracket 6 for attaching the cover 7 is prepared. As shown in the example in FIG. 9C, the prepared bracket 6 is arranged around the opening 23 of the blocking layer 2 and fixed using the adhesive 64 and the double-sided adhesive tape 65 such that at least a portion of the bracket 6 is blocked by the blocking layer 2.

Next, the cover 7 holding the camera 81 is attached to the bracket 6. The windshield 100 on which the camera 81 is mounted and in which the antifog film 4 is attached to the information acquisition region 3 as shown in the example in FIG. 9D can thus be produced.

Features

As described above, with this embodiment, the heat blocking layer 42 for blocking heat exchange is provided between the antifog layer 43 that has antifog properties and the glass plate 1 (information acquisition region 3), in the antifog film 4. Therefore, even if the surface on the vehicle interior side of the information acquisition region 3 becomes cold, the heat blocking layer 42 can suppress a decrease in the temperature of the antifog layer 43 of the antifog film 4 as well. Accordingly, with this embodiment, it is possible to make it less likely that the temperature of the antifog layer 43 decreases, thus making it possible to suppress impairment of the antifog function of the information acquisition region 3. For example, when the antifog layer 43 is formed as the above-mentioned water absorption type, it is possible to suppress a decrease in the saturated water absorption amount of the antifog layer 43. In particular, using a material having a thermal conductivity of $5 \times 10^{-4}$ cal/cm·sec·° C. or lower for the heat blocking layer 42 and making the thickness D2 of the heat blocking layer 42 larger than the thickness D1 of the blocking layer 2 makes it possible to sufficiently ensure the heat blocking properties of the heat blocking layer 42 and appropriately suppress impairment of the antifog function of the information acquisition region 3.

It should be noted that, when the thickness value of the glass plate 1 is taken as T1 (unit: mm) and the thickness value of the interlayer 13 is taken as T2 (unit: mm), and T1×T2 is 4 (dimensional unit is "$mm^2$") or less, dew condensation is likely to occur on the surface on the vehicle interior side of the glass plate 1. When T1×T2 is 3 or less, or 2.5 or less, dew condensation is more likely to occur on the surface on the vehicle interior side of the glass plate 1. Moreover, when the information acquisition region 3 is provided in a range of 250 mm or less from the upper end of the glass plate 1, dew condensation is likely to occur on the surface on the vehicle interior side of the information acquisition region 3. When the information acquisition region 3 is provided in a range of 200 mm or less from the upper end of the glass plate 1, dew condensation is more likely to occur on the surface on the vehicle interior side of the information acquisition region 3. The reason for this is that the flow of an air current has an effect. For the same reason, the information acquisition region 3 is provided in a range of 200 mm or less or 150 mm or less from both ends in the left-right direction, dew condensation is likely to occur on the surface on the vehicle interior side of the information acquisition region 3. Furthermore, the closer to the horizontal direction an angle at which the windshield 100 is attached is, the more likely dew condensation is to occur on the surface on the vehicle interior side of the glass plate 1. For example, when an angle at which the windshield 100 is attached is 45° or less, or 30° or less, from the horizontal direction, dew condensation is likely to occur on the surface on the vehicle interior side of the glass plate 1. In this case, the antifog function of the antifog film 4 is further exhibited.

Moreover, with this embodiment, the blocking layer 2 and the camera 81 are provided in the region surrounding the information acquisition region 3, and therefore, the temperature therearound is likely to rise due to the camera 81 generating heat and the blocking layer 2 being heated. In addition, as mentioned above, the temperature around the information acquisition region is less likely to decrease due to the heat blocking layer 42. Therefore, with this embodiment, heat around the information acquisition region 3 can be effectively utilized, thus making it possible to use the antifog film 4 to efficiently prevent fog around the information acquisition region 3.

It should be noted that windshields may be stored in a warehouse for half a year or longer until they are used after being manufactured. At this time, humidity and temperature in the warehouse are often not controlled. Therefore, there is a possibility that the antifog performance of the antifog laminate (above-described antifog film 4) will be impaired. For example, in the case where an antifog laminate includes an absorbent-type antifog layer as the above-described embodiment, the antifog layer absorbs water when the humidity in the warehouse increases, and the antifog performance of the antifog laminate is thus impaired. To address this, in the above-described embodiment, a means for protecting the antifog layer 43 until the windshield 100 is used may be provided.

When the antifog layer 43 is formed using a polymer as a main component as described above, the antifog layer 43 is relatively soft and thus has low scratch resistance. Therefore, the antifog layer 43 may be damaged during a process of distributing the windshield 100. When the pencil hardness is approximately 4H or more, the antifog layer 43 is relatively hard, and scratch resistance is less likely to be a problem. On the other hand, when the pencil hardness is 2H or less, the antifog layer 43 is relatively soft, and scratch resistance is likely to be a problem. Therefore, the pencil hardness of the antifog layer 43 may be used as an index to determine whether or not a means for protecting the antifog layer 43 is employed. For example, it may be determined that the means for protecting the antifog layer 43 is employed when the pencil hardness is 2H or more, and the means for protecting the antifog layer 43 is not employed in the other cases. It should be noted that the means for protecting the antifog layer 43 is a film material, for example. There may be cases where it is difficult to distinguish this film material from the antifog film 4. To address this, this film material may be provided with a distinction means for making a distinction from the antifog film 4. For example, the distinction means may be providing marks, letters, figures, signs, or the like to the film material, or coloring at least a portion of the film material with a color that is different from that of the antifog film 4.

§ 3 Modified Example

As described above, the embodiment of the present invention has been described in detail, but the foregoing description is, in all respects, merely an example of the present invention. It goes without saying that various improvements and modifications can be made without departing from the scope of the present invention. For example, the constituent elements of the above-described windshield 100 may be omitted, replaced, and added as appropriate according to the embodiment. Also, the shapes and sizes of the constituent elements of the above-described windshield 100 may be determined as appropriate according to the embodiment. For example, the following modifications are possible. It should be noted that in the following description, constituent elements that are similar to those of the above-described embodiment are denoted by similar reference numerals, and description of configurations that are similar to those of the above-described embodiment is omitted as appropriate.

3.1

For example, the glass plate 1 of the windshield 100 according to the above-described embodiment is constituted by a laminated glass obtained by joining the outer glass plate 11 and the inner glass plate 12 together via the interlayer 13. However, the type of glass plate 1 need not be limited to such an example and may be selected as appropriate according to the embodiment. The glass plate 1 may also be constituted by a single glass plate, for example. Furthermore, with the above-described embodiment, the glass plate 1 is formed in a substantially trapezoidal shape. However, the shape of the glass plate 1 need not be limited to such an example and may be selected as appropriate according to the embodiment.

For example, with the above-described embodiment, the glass plate 1 is formed in a curved shape through gravity bending molding. However, the method for molding the glass plate 1 need not be limited to such an example and may be selected as appropriate according to the embodiment. The glass plate 1 may also be formed in a curved shape through known press molding.

3.2

For example, with the above-described embodiment, the camera 81 is used as the information acquisition device. However, the information acquisition device need not be limited to such an example as long as a device that can acquire information from the outside of a vehicle by emitting and/or receiving light is used, and may be selected as appropriate according to the embodiment. Moreover, the number of information acquisition devices installed inside a vehicle need not be limited to two and may be selected as appropriate according to the embodiment. Examples of the information acquisition device include a visible light/infrared camera for measuring the distance between vehicles, a light receiving device for receiving signals from the outside of the vehicle that are emitted by an optical beacon or the like, a camera using visible light and/or infrared rays that reads white lines on the road or the like as images, and a stereo camera that can identify the position of a subject through a stereoscopic vision.

3.3

For example, with the above-described embodiment, the bracket 6 is formed in a frame shape, and the cover 7 is formed in a rectangular shape so as to be capable of being attached to the bracket 6. However, the shapes of the bracket 6 and the cover 7 need not be limited to such examples as long as they can support the information acquisition device and can be fixed to the blocking layer 2, and may be selected as appropriate according to the embodiment. The bracket 6 may also be provided with a plurality of openings so as to correspond to a plurality of information acquisition devices. In order to mount a plurality of information acquisition devices on the windshield 100, a plurality of pairs of the bracket 6 and the cover 7 may also be prepared and attached to the glass plate 1.

3.4

For example, with the above-described embodiment, the upper region 221 and the lower region 222 of the blocking layer 2 have different layer structures. However, the blocking layer 2 need not be limited to such an example, and these regions may have the same layer structure. It should be noted that, when hot wires are provided within and/or around the opening 23, an electric current can be applied to the hot wires through the above-mentioned silver layer 242. Therefore, in such a case, it is preferable that the blocking layer 2 has a layer structure including the silver layer 242 as described above.

For example, with the above-described embodiment, the blocking layer 2 is provided along the peripheral edge portion of the glass plate 1. The blocking layer 2 may also be omitted. The shape of the blocking layer 2 need not be limited to the shape shown in the example in FIG. 1 and may be selected as appropriate according to the embodiment. Moreover, the periphery of the opening 23 of the blocking layer 2 is completely closed. However, the configuration of the opening 23 need not be limited to such an example. For example, the edge of the opening 23 may also be open in one or more directions.

Figure 11:
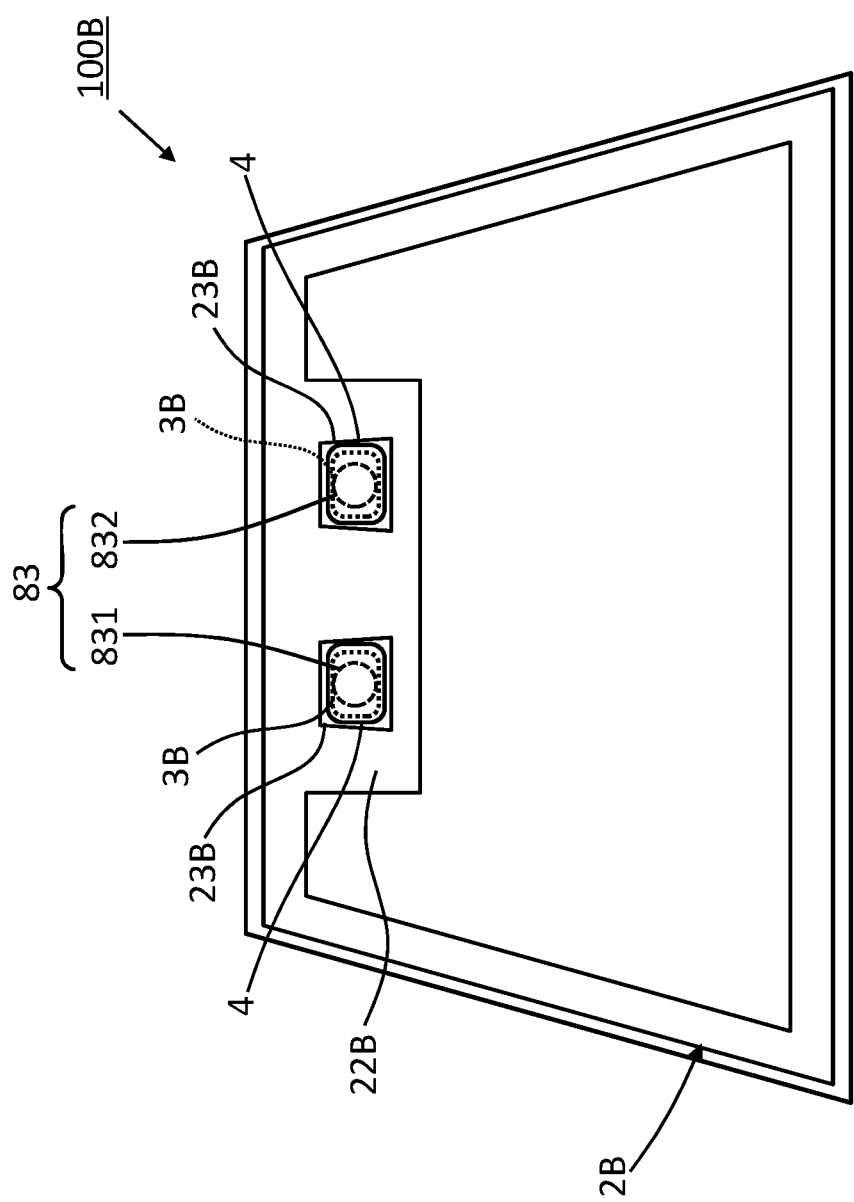

For example, in a case where a stereo camera is installed inside a vehicle as the information acquisition device as shown in the example in FIG. 11, the information acquisition regions 3 and the openings 23 may be provided at a plurality of positions. FIG. 11 shows an example of a windshield 100B on which a stereo camera 83 including two cameras (831, 832) can be mounted.

With the windshield 100B shown in the example in FIG. 11, a blocking layer 2B includes a protruding portion 22B that is slightly elongated in the left-right direction. This protruding portion 22B is provided with openings 23B at positions corresponding to the positions of the cameras (831, 832) of the stereo camera 83. Accordingly, information acquisition regions 3B are appropriately located within the openings 23B. At this time, as shown in FIG. 11, the antifog films 4 may be separately attached to the two information acquisition regions 3B.

Figure 12:
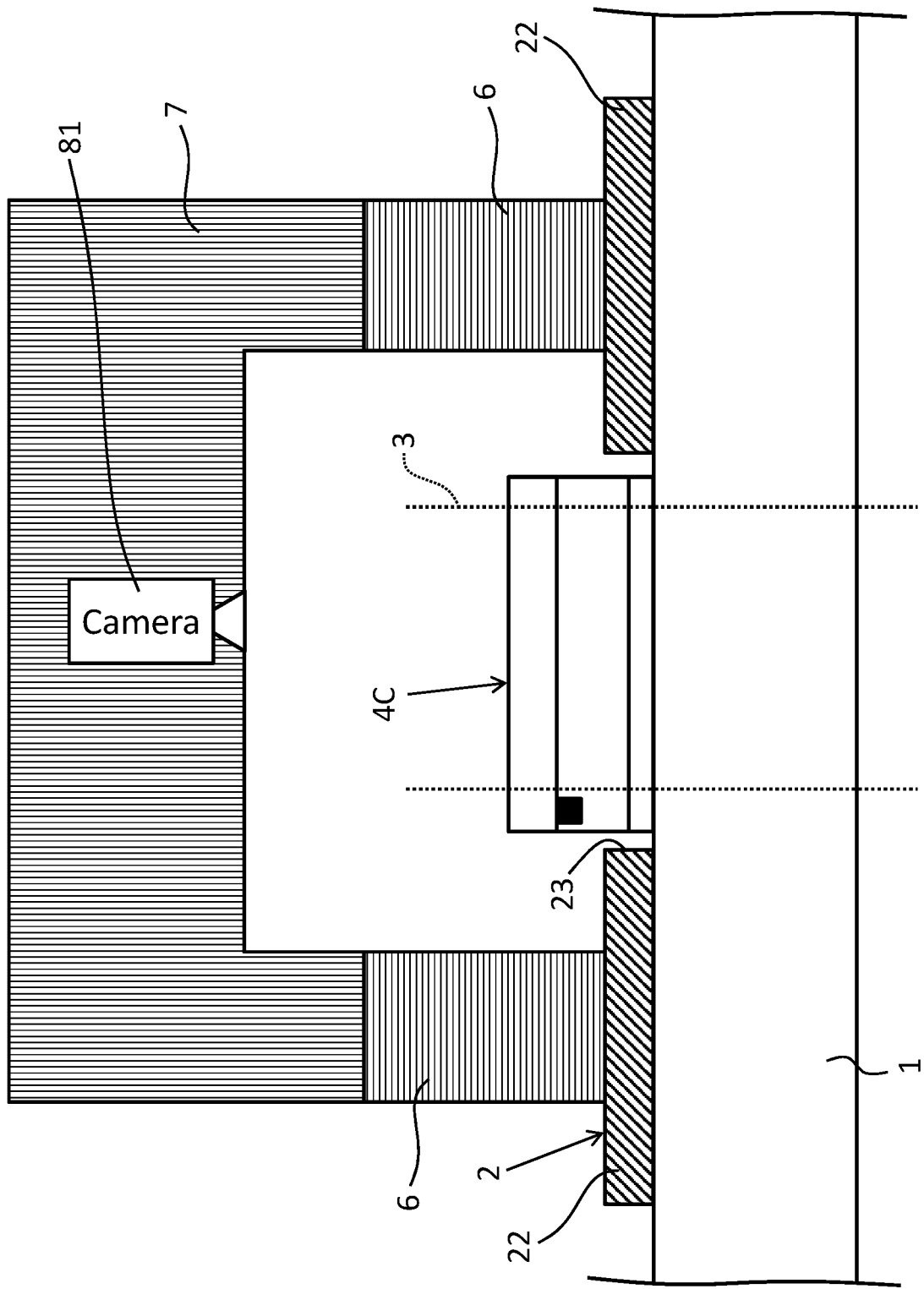
FIG. 12 schematically shows an example of the arrangement of an antifog film according to another embodiment.

Moreover, as shown in the example in FIG. 12, a configuration may be employed in which no portion of the edge of the antifog film 4 is in contact with the edge of the opening 23. FIG. 12 schematically shows an example of the arrangement of an antifog film 4C in this modified example. The planar size of the antifog film 4C shown in the example in FIG. 12 is smaller than the planar size of the opening 23, and no portion of the edge of the antifog film 4C is in contact with the edge of the opening 23. As described above, the antifog film may also be arranged so as not to be in contact with the edge of the opening of the blocking layer.

It should be noted that bringing at least a portion of the edge of the antifog film into contact with the edge of the opening of the blocking layer makes it possible to perform the positioning of the antifog film using such a portion. Therefore, in order to enable such positioning, the entirety of the edge of the antifog film 4 may be in contact with the edge of the opening 23 when the planar size of the antifog film 4 is substantially the same as the planar size of the opening 23. Moreover, when the planar size of the antifog film 4 is made smaller than the planar size of the opening 23, it is sufficient that any portion of the edge of the antifog film 4 is in contact with any portion of the edge of the opening 23.

For example, with the above-described embodiment, the blocking layer 2 is layered on the surface on the vehicle interior side of the inner glass plate 12. However, the surface on which the blocking layer 2 is layered need not be limited to such an example and may be selected as appropriate according to the embodiment. For example, the blocking layer 2 may also be layered on the surface on the vehicle interior side of the outer glass plate 11 and/or the surface on the vehicle exterior side of the inner glass plate 12.

For example, with the above-described embodiment, a portion of the edge 44 of the antifog film 4 is in contact with the edge 231 of the opening 23. However, the arrangement of the antifog film 4 need not be limited to such an example. For example, the antifog film 4 may also be arranged such that the entirety of the edge 44 is in contact with the edge 231 of the opening 23. If at least a portion of the edge 44 of the antifog film 4 is in contact with the edge 231 of the opening 23, an effect similar to that of the above-described embodiment can be obtained.

For example, with the above-described embodiment, the configuration is employed in which the edge of the opening 23 of the blocking layer 2 and the edge of the antifog film 4 are in contact with each other on the right side in the left-right direction. However, the two edges may also be in contact with each other on the left side. That is, a configuration may also be employed in which a portion where the edge of the opening 23 of the blocking layer 2 and the edge of the antifog film 4 are in contact with each other is arranged on one side in the left-right direction.

In the glass plate 1 according to the above-described embodiment, the opening 23 of the blocking layer 2 is arranged on the upper end side. Therefore, a worker attaches the antifog film 4 to the glass plate 1 while facing the upper end side of the glass plate 1. At this time, the worker holds a squeegee for attaching the antifog film 4 with his/her dominant hand, and moves the squeegee from the dominant hand side toward the opposite side. Accordingly, if the portion where the edge of the opening 23 of the blocking layer 2 and the edge of the antifog film 4 are in contact with each other is located on the dominant hand side, the workability of attaching the antifog layer 4 can be enhanced.

For example, when performing work to attach the antifog film 4, a right-handed worker holds a squeegee with his/her right hand and moves the squeegee from right to left in a state in which the squeegee is pressed against the antifog film 4. At this time, when the edge of the opening and the edge of the antifog film are in contact with each other on the right side as in the above-described embodiment, the worker can place the antifog film 4 on the glass plate 1, before using the squeegee, such that the edge 231 of the opening 23 and the edge 44 of the antifog film 4 are in contact with each other on the right side on which the worker holds the squeegee. Therefore, the worker can perform accurate positioning of the antifog film 4 and attach the antifog film 4 to the glass plate 1 without positional shift by using the state in which the edge 231 of the opening 23 and the edge 44 of the antifog film 4 are in contact and moving the squeegee from right to left from such a contact position. Accordingly, locating the portion where the edge of the opening 23 of the blocking layer 2 and the edge of the antifog film 4 are in contact with each other on the worker's dominant hand side makes it possible to enhance the workability of attaching the antifog film 4. That is, when the antifog film is manually attached, the workability of attaching the antifog film can be enhanced in the workplace by determining the side on which the edge of the opening of the blocking layer and the edge of the antifog film are in contact with each other according to the ratio of the dominant hands of workers who perform such operations.

3.5

With the above-described embodiment, the planar size of the antifog film 4 is smaller than the planar size of the opening 23 of the blocking layer 2. However, the planar size of the antifog film 4 need not be limited to such an example and may also be larger than the planar size of the opening 23.

Figure 13:
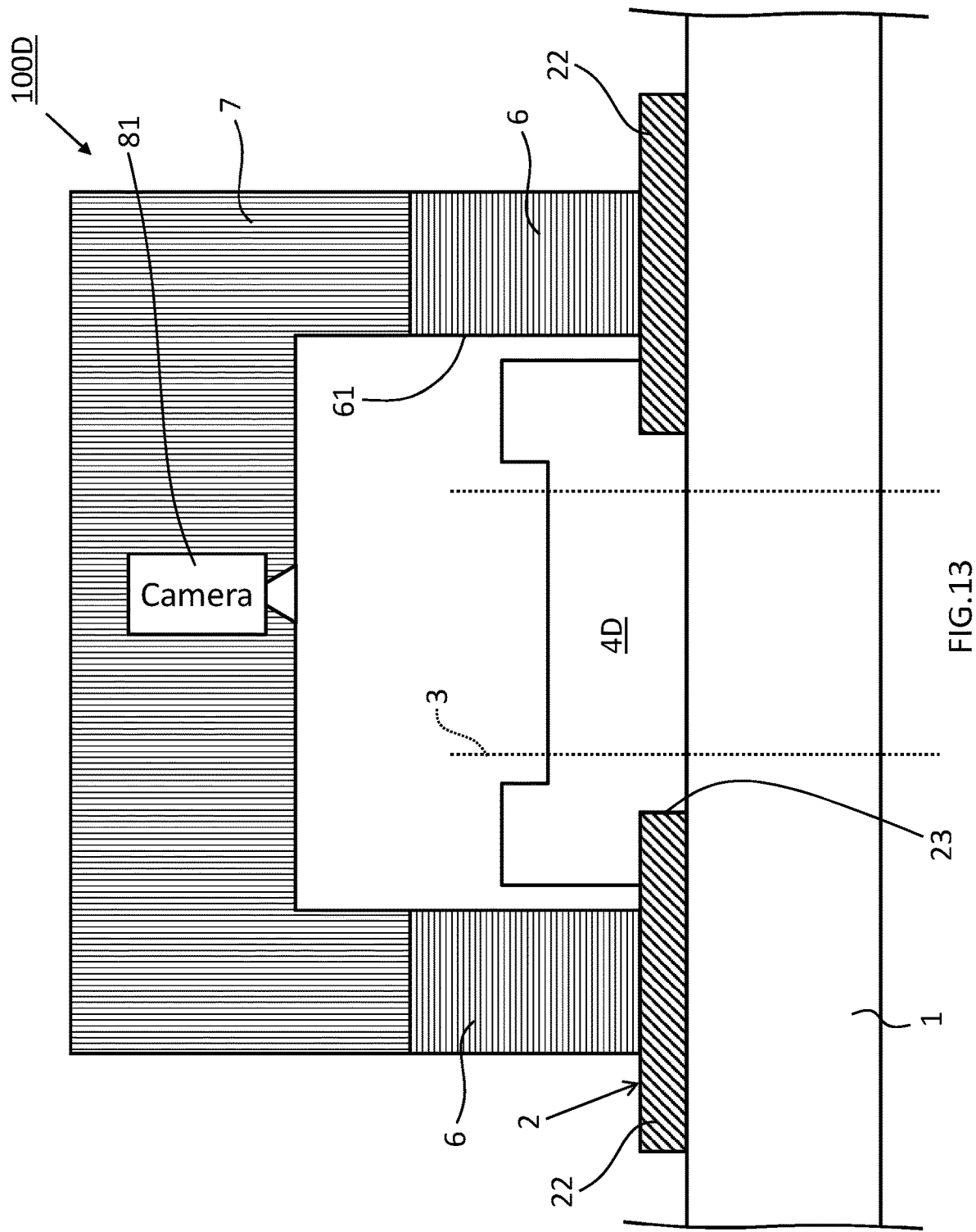
FIG. 13 schematically shows an example of an antifog film according to another embodiment.
Figure 14:
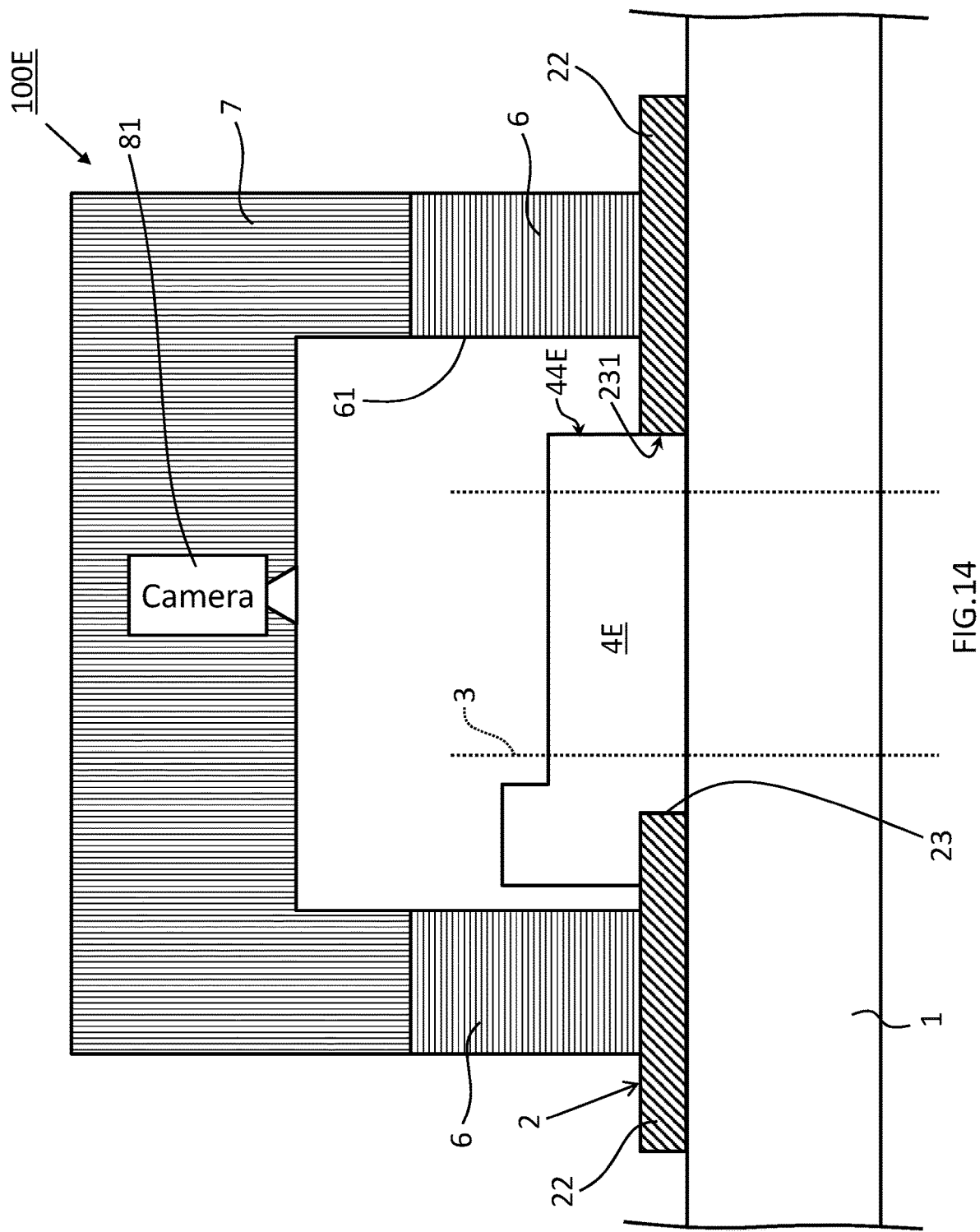
FIG. 14 schematically shows an example of an antifog film according to another embodiment.

For example, the planar size of the antifog film may also be set as shown in the examples in FIGS. 13 and 14. FIG. 13 schematically shows an example of a windshield 100D in which an antifog film 4D with a planar size larger than the planar size of the opening 23 is attached to the information acquisition region 3. For example, the planar size of the antifog film 4D may also be set to be larger by 10 mm in the vertical direction and the horizontal direction than the planar size of the opening 23. At this time, as shown in the example in FIG. 13, the planar size of the antifog film 4D is set to be smaller than the internal size (planar size of the attachment opening 61) of the bracket 6. Therefore, the antifog film 4D is attached to the surface on the vehicle interior side of the information acquisition region 3 such that a portion of the antifog film 4D is on the blocking layer 2 (protruding portion 22), but is not on the bracket 6.

In the case where the antifog film 4D is of the water absorbent type as mentioned above, the larger the size of the antifog film 4D is made, the higher the antifog ability imparted to the information acquisition region 3 is made. Therefore, making the planar size of the antifog film 4D larger than the planar size of the opening 23 in the same manner as in this modified example makes it possible to enhance the antifog ability imparted to the information acquisition region 3.

FIG. 14 schematically shows an example of a windshield 100E in which a right edge 44E of an antifog film 4E with a planar size larger than the planar size of the opening 23 is in contact with the right edge 231 of the opening 23. As shown in this diagram, even when the planar size of the antifog film 4E is made larger than the planar size of the opening 23, at least a portion of the edge of the antifog film 4E may also be in contact with the edge of the opening 23.

It should be noted that, although the layer structures of the antifog films are not shown in FIGS. 13 and 14, the antifog films (4D, 4E) have the same layer structure as that of the antifog film 4 according to the above-described embodiment.

3.6

With the above-described embodiment, the planar size of the opening 23 is larger than the planar size of the information acquisition region 3, and the planar size of the antifog film 4 is larger than the planar size of the information acquisition region 3 and smaller than the planar size of the opening 23. However, the relationship between the sizes of the constituents need not be limited to such an example and may be selected as appropriate according to the embodiment. For example, in order to enhance the workability of attaching the antifog film 4, it is sufficient that the planar size of the antifog film 4 is smaller than the planar size of the opening 23, and the planar size of the information acquisition region 3 may be set as appropriate. Moreover, for example, the planar sizes of the opening 23, the information acquisition region 3, and the antifog film 4 may also be substantially the same.

3.7

For example, with the above-described embodiment, the thickness D2 of the heat blocking layer 42 is larger than the thickness D1 of the blocking layer 2 (protruding portion 22). However, the thickness D2 of the heat blocking layer 42 need not be limited to such an example, and may also be smaller than the thickness D1 of the blocking layer 2. In this case, the sum of the thickness D2 of the heat blocking layer 42 and the thickness D3 of the antifog layer 43 may be larger than the thickness D1 of the blocking layer 2 or smaller than the thickness D1 of the blocking layer 2. It should be noted that, when the sum of the thickness D2 of the heat blocking layer 42 and the thickness D3 of the antifog layer 43 is larger than the thickness D1 of the blocking layer 2, it is possible to prevent the blocking layer 2 from physically interfering while the antifog film 4 is being attached in the same manner as in the above-described embodiment.

3.8

For example, with the above-described embodiment, the attachment indication marks 45 are provided on the heat blocking layer 42 of the antifog film 4. However, the attachment indication marks 45 may also be omitted as appropriate. Moreover, the number, arrangement, and shape of the attachment indication marks 45 may be selected as appropriate according to the embodiment.

3.9

For example, with the above-described embodiment, the antifog film 4 is formed in a rectangular shape in a plan view, and the corner portions 46 are rounded. However, the shape of the antifog film 4 is not limited to such an example and may be selected as appropriate according to the embodiment. Similarly, with the above-described embodiment, the information acquisition region 3 is shown as a rectangular region, and the opening 23 is formed in a trapezoidal shape. However, there is no limitation to such an example. The shape of the information acquisition region 3 may be set as appropriate depending on the information acquisition device to be used, and the shape of the opening 23 may be determined as appropriate such that the information acquisition device can acquire information about the outside of a vehicle. For example, the opening 23 may have a circular shape, an elliptic shape, an eye shape, a rectangular shape, or the like.

It should be noted that, with the above-described embodiment, the corner portions 46 are rounded, thus making it possible to make it less likely that the antifog film 4 peels away from the surface on the vehicle interior side of the information acquisition region 3. In particular, with the above-described embodiment, the bracket 6 is attached. In some cases, the temperature inside the bracket 6 may become relatively high due to use of the camera 81. In a case where the substrate layer of the antifog film is made of a material having a high thermal shrinkage percentage, when the temperature inside the bracket 6 rises, stress is applied to the substrate layer of the antifog film due to the difference between swelling of the substrate layer and the swelling of the glass plate, and there is a possibility that the antifog film will thus peel away. Therefore, a configuration in which the corner portions 46 are rounded and the antifog film 4 is thus less likely to peel away from the surface on the vehicle interior side of the information acquisition region 3 exhibits an improved effect when a material having a high thermal shrinkage percentage is used for the substrate layer 41 of the antifog film 4. It should be noted that the material having a high thermal shrinkage percentage is a material whose thermal shrinkage percentage is 0.7% or more when the material is allowed to stand at 150° C. for 30 minutes. Examples of such a material include Tetoron Film (manufactured by Teijin), COSMOSHINE A4300 (manufactured by TOYOBO Co., Ltd.), and Lumirror (TORAY INDUSTRIES Inc.).

Moreover, in the above-mentioned diagrams, the four corner portions 46 have the same roundness. However, at least one of the four corner portions 46 need not be rounded. Moreover, at least one of the four corner portions 46 may have a smaller curvature of roundness than those of the other corner portions 46. A state in which the curvature of the roundness is smaller than those of the other corner portions 46 may encompass a state in which the corner portion 46 is sharp.

Since the antifog film 4 is made of an organic material, there is a possibility that the antifog film 4 will need to be replaced from the viewpoint of durability. In addition, when the attachment of the bracket 6 or the like fails, there is a possibility that the antifog film 4 will need to be replaced. When the antifog film 4 is replaced, the smaller the curvature of the roundness of the corner portion 46 is, that is, the sharper the corner portion 46 is, the more easily the antifog film is to remove using the corner portion 46 as a starting point. Therefore, providing a corner portion 46 having a smaller curvature of roundness than those of the other corner portions 46 makes it possible to enhance the workability of replacing the antifog film 4. In particular, it is difficult to remove an antifog film that is attached to a highly smooth substance such as the glass plate 1. Therefore, a configuration in which the corner portion 46 having a smaller curvature of roundness than those of the other corner portions 46 is provided and the workability of replacing the antifog film 4 is thus enhanced exhibits an improved effect when the antifog film 4 is attached to the glass plate 1 as in this embodiment. It should be noted that, as described above, a film material serving as a protecting means may be attached to the antifog film 4 before use. When this film material is removed, the corner portion 46 having a smaller curvature of roundness than those of the other corner portions 46 can be used as a starting point. This makes it possible to enhance the workability of removing the film material.

However, if the curvatures of all of the corner portions 46 are reduced, there is a possibility that the antifog film 4 will be more likely to peel away. Therefore, it is preferable that only one of the corner portions 46 has a small curvature as described above, and the other three corner portions 46 have large curvatures. This makes it possible to suppress the spontaneous detachment of the antifog film 4 and to enhance the workability of replacing the antifog film 4.

It should be noted that, as in the above-described modified examples (FIGS. 13 and 14), the corner portion 46 having a smaller curvature of roundness than those of the other corner portions 46 may be on the blocking layer 2 (protruding portion 22). This makes it easier to remove the antifog film 4.

3.10

With the above-described embodiment, the antifog film 4 is formed to have a rectangular cross section. However, the cross-sectional shape of the antifog film 4 need not be limited to such an example and may be selected as appropriate according to the embodiment.

Figure 15:
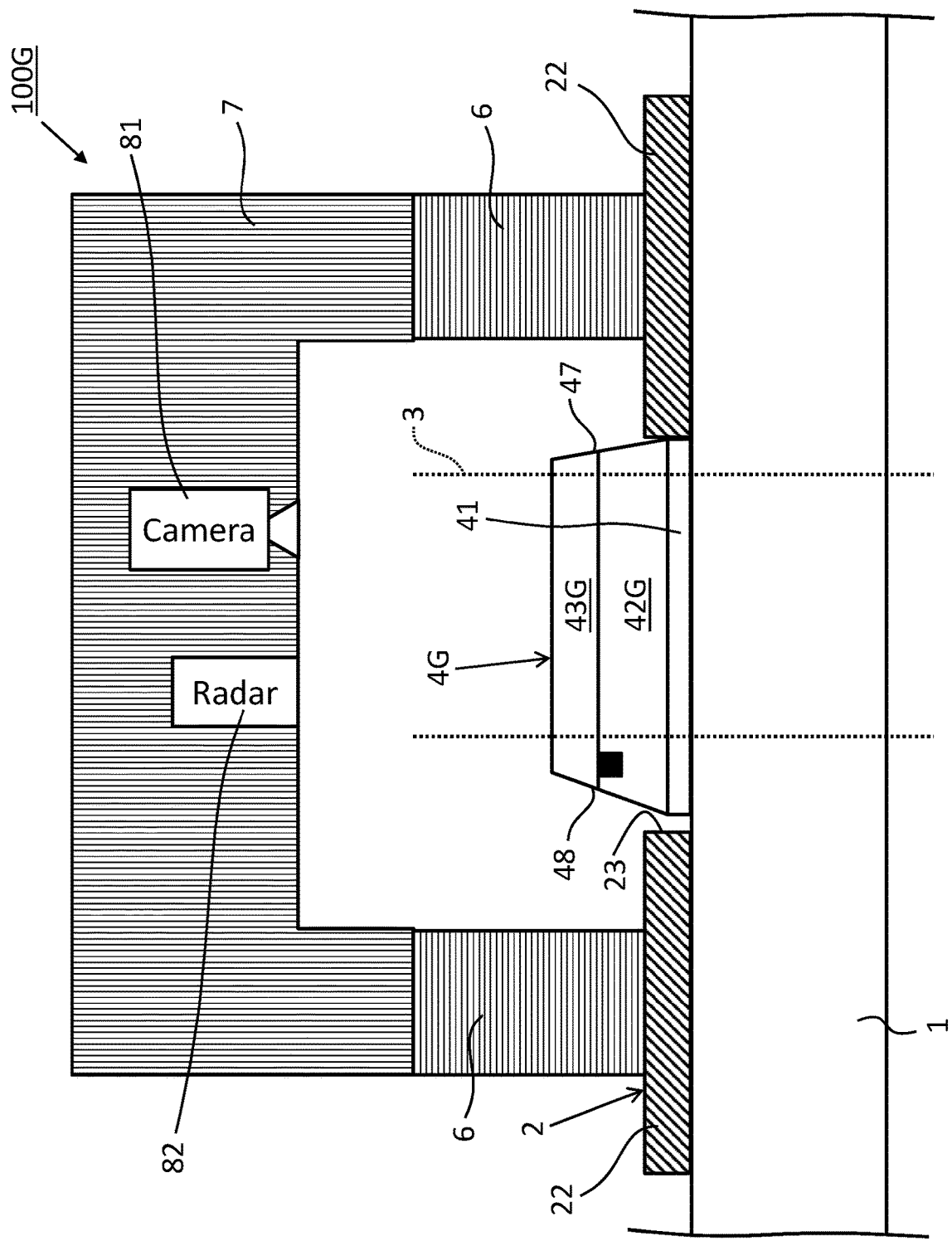
FIG. 15 is a schematic cross-sectional view showing an example of an antifog film according to another embodiment.

For example, a shape shown in the example in FIG. 15 may be employed. FIG. 15 schematically shows an example of a windshield 100G in which an antifog film 4G formed to have a trapezoidal cross section is attached to the information acquisition region 3. In this windshield 100G, the antifog film 4G is formed to have a trapezoidal cross section in which a side on the antifog layer 43G side is shorter than a side on the heat blocking layer 42G side.

With this configuration, as shown by the example in FIG. 15, when the antifog film 4G is attached so as to fit in the opening 23, gaps can be formed between legs (47, 48) of the trapezoidal shape and the edge of the opening 23. Therefore, even when the temperature around the antifog film 4G rises, the antifog film 4G can thermally expand by the amount corresponding to the gaps. Accordingly, with this modified example, it is possible to suppress the detachment of the antifog film 4G caused by the thermal expansion of the antifog film 4G.

Furthermore, in the modified example shown in the example in FIG. 15, the camera 81 and a radar 82 are lined up in the horizontal direction. The radar 82 is an example of the above-mentioned laser device. With this modified example, in the trapezoidal shape seen in the antifog film 4G, the leg 48 located on the side on which the radar 82 is arranged is inclined at a larger angle than an angle at the leg 47 located on the side on which the camera 81 is arranged is inclined. That is, when the glass plate 1 side is taken as the lower side, the leg 47 located on the side on which the camera 81 is arranged is inclined at an angle closer to the vertical direction compared to the leg 48 located on the side on which the radar 82 is arranged.

When the camera 81 and the radar 82 are compared, the angle of view, namely the information acquisition region 3, required for the camera 81 is wider than that required for the radar 82. To address this, with this modified example, the inclination angle of the leg 47 on the side on which the camera 81 is arranged is set to be smaller than or equal to the inclination angle of the leg 48 on the side on which the radar 82 is arranged (i.e., the inclination angle of the leg 47 with respect to the surface of the glass plate 1 is set not to be close to the horizontal direction), thus making it possible to make it less likely that the leg 47 of the antifog film 4G enters the angle of view of the camera 81. Accordingly, it is possible to prevent the edge of the antifog film 4G from entering the angle of view and thereby inhibiting the camera 81 from taking images.

It should be noted that the antifog film 4G having such a trapezoidal cross section can be produced as appropriate. For example, a flat-shaped antifog film having a rectangular cross section is prepared as in the above-described embodiment, and is then cut from the antifog layer side using an NC machine tool. At this time, cutting the antifog film with a cutter blade not in the vertical direction but in the oblique direction makes it possible to form the antifog film 4G having a trapezoidal cross section.

3.11

Various types of interlayers can be employed as the interlayer 13 of the glass plate 1. For example, an interlayer containing heat-ray absorbing particles such as ITO (Indium Tin Oxide) particles or ATO (Antimony Tin Oxide) particles may be used.

Figure 16:
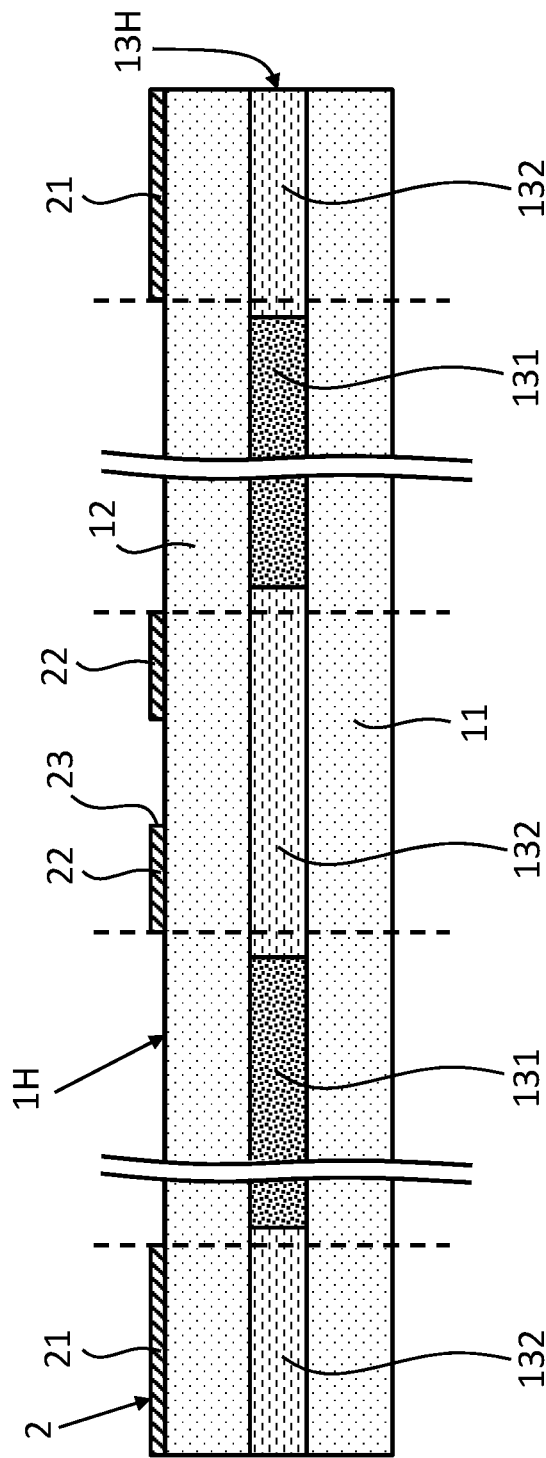
FIG. 16 is a schematic cross-sectional view showing an example of an interlayer according to another embodiment.

For example, a configuration shown in the example in FIG. 16 may be employed. FIG. 16 is a schematic cross-sectional view of a glass plate 1H according to this modified example. As shown in FIG. 16, an interlayer 13H according to this modified example is divided into two types of regions, namely a first region 131 and a second region 132. The first region 131 does not overlap the blocking layer 2 and the opening 23 in a plan view. On the other hand, the second region 132 overlaps the blocking layer and the opening 23 in a plan view. With this modified example, the heat-ray absorbing particles as mentioned above are not arranged in the second region 132, and are arranged in the first region 131.

With this modified example, the heat-ray absorbing particles are not arranged in the information acquisition region (opening 23), thus making it possible to suppress an influence of the particles on the acquisition of information by the camera 81. Moreover, the particles are not arranged at a position overlapping the blocking layer 2 in a plan view, thus making it possible to allow light from the outside of a vehicle to reach the blocking layer 2 arranged on the surface on the vehicle interior side of the glass plate 1. This makes it likely that the blocking layer 2 becomes warm, and due to the heat of the blocking layer 2 in addition to the effect of the antifog film 4, it is possible to make it less likely that dew condensation occurs on the glass plate 1.

It should be noted that such an interlayer 13H can be produced as follows, for example. That is, a first interlayer that contains heat-ray absorbing particles and a second interlayer that does not contain the particles are prepared and layered, and a portion at which the second region 132 is to be formed is cut out. Then, the cutout portion of the first interlayer is replaced with the cutout portion of the second interlayer. The interlayer 13H can thus be produced (see Japanese Patent No. 4442863, for example). CWO (Cesium Tungsten Oxide) particles, which are used as an infrared ray blocking material, are not heat-ray absorbing particles. Therefore, in the above-mentioned modified example, the CWO particles may be contained in the second region 132.

3.12

With the above-described embodiment, the heat blocking layer 42 is constituted by a single layer. However, the heat blocking layer 42 may also be constituted by a plurality of layers such that thermal conductivity decreases. With this configuration, heat exchange between the glass plate 1 and the antifog layer 43 can by further blocked, thus making it possible to prevent a decrease in temperature near the antifog layer 43 and thereby suppress impairment of the antifog function.

3.13

In the above-described embodiment and modified examples, the antifog film 4 formed in a film shape is shown as an example of the "antifog laminate" of the present invention. However, the antifog laminate need not be limited to such a film material and may be selected as appropriate according to the embodiment as long as it can be layered on the surface on the vehicle interior side of the glass plate 1. For example, the antifog laminate may also be a coating or the like. It should be noted that, when the antifog laminate is formed through coating, the antifog laminate can be layered as described below. That is, a PET substrate or the like serving as a heat blocking layer is attached to a region of the surface on the vehicle interior side of a glass plate (information acquisition region) on which an antifog laminate is to be layered. Subsequently, a liquid agent is applied to the PET substrate through spraying or flow coating to form an antifog layer. At this time a region other than the region on which an antifog layer is to be formed is masked. Masking can be performed using a frame material made of silicone, for example. When a frame material made of silicone is used for masking, a liquid agent can be applied to the region on which an antifog layer is to be formed by pouring the liquid agent on this frame material. Subsequently, the glass plate is subjected to preliminary firing (e.g., at 120° C. for 10 minutes) with the frame material made of silicone being attached thereto. Then, the frame material made of silicone is removed, and the glass plate is subjected to final firing at a high temperature and a high humidity (80° C., 90%) for 30 minutes. The glass plate on which an antifog laminate is layered can thus be produced. It should be noted that, at this time, a liquid agent with a liquid composition similar to that of the above-described antifog layer 42 may also be used to form a coating serving as an antifog layer.

LIST OF REFERENCE NUMERALS

100 . . . Windshield
1 . . . Glass plate,
11 . . . Outer glass plate, 12 . . . Inner glass plate, 13 . . . Interlayer,
2 . . . Blocking layer,
21 . . . Peripheral edge portion, 22 . . . Protruding portion, 23 . . . Opening, 231 . . . Edge,
3 . . . Information acquisition region,
4 . . . Antifog film,
41 . . . Sticky layer, 42 . . . Heat blocking layer, 43 . . . Antifog layer, 44 . . . Edge,
45 . . . Attachment indication mark, 46 . . . Corner portion,
6 . . . Bracket,
61 . . . Attachment opening, 62 . . . Main body, 63 . . . Supporting portion,
64 . . . Adhesive, 65 . . . Double-sided adhesive tape,
7 . . . Cover,
71 . . . Recessed portion, 72 . . . Wall surface, 73 . . . Lenses,
81 . . . Camera, 82 . . . Radar

The invention claimed is:

1. A windshield for an automobile on which an information acquisition device capable of acquiring information from an outside of a vehicle by emitting and/or receiving light can be arranged, the windshield comprising:
    a glass plate including an information acquisition region that is opposite to the information acquisition device and through which the light passes;
    an antifog laminate that includes a heat blocking layer and an antifog layer with antifog properties layered on one surface of the heat blocking layer, and that is layered on a surface on a vehicle interior side of the information acquisition region while the other surface of the heat blocking layer faces the surface on the vehicle interior side of the information acquisition region, and
    a blocking layer that is provided on the glass plate and blocks a field of vision from the outside of the vehicle, wherein
    the blocking layer is provided with an opening that is arranged to correspond to the information acquisition region,
    a bracket, to which a cover for mounting the information acquisition device on the windshield is attached, is arranged around the opening of the blocking layer and fixed such that at least a portion of the bracket is blocked by the blocking layer,
    the antifog layer contains a water absorbent resin as a main component, and
    the water absorbent resin contains a water repellent group.

2. The windshield according to claim 1, wherein a planar size of the antifog laminate is larger than a planar size of the opening of the blocking layer.

3. The windshield according to claim 2, wherein
    the bracket is formed in a frame shape, and
    the planar size of the antifog laminate is smaller than an internal size of the bracket.

4. The windshield according to claim 1, wherein a planar size of the antifog laminate is smaller than a planar size of the opening of the blocking layer.

5. The windshield according to claim 1, wherein
a planar size of the opening of the blocking layer is larger than a planar size of the information acquisition region, and
a planar size of the antifog laminate is larger than the planar size of the information acquisition region and smaller than the planar size of the opening of the blocking layer.

6. The windshield according to claim 1, wherein at least a portion of an edge of the antifog laminate is in contact with an edge of the opening of the blocking layer.

7. The windshield according to claim 6, wherein
an imaging device for taking images of the outside of the vehicle through the information acquisition region and a laser device for emitting and/or receiving a ray of light that serve as the information acquisition devices are lined up in a horizontal direction, and
a portion where the edge of the opening of the blocking layer and the edge of the antifog laminate are in contact with each other is arranged on the imaging device side.

8. The windshield according to claim 1, wherein a total thickness of the heat blocking layer and the antifog layer of the antifog laminate is larger than a thickness of the blocking layer.

9. The windshield according to claim 8, wherein a thickness of the heat blocking layer of the antifog laminate is larger than the thickness of the blocking layer.

10. The windshield according to claim 1,
wherein the glass plate includes an outer glass plate arranged on a vehicle exterior side and an inner glass plate arranged on a vehicle interior side,
an interlayer containing heat-ray absorbing particles is arranged between the outer glass plate and the inner glass plate, and
the particles are not arranged in a region of the interlayer that overlaps the blocking layer and the opening in a plan view, and are arranged in the other region.

11. The windshield according to claim 1, wherein
the antifog layer contains, as the water absorbent resin, at least one type of polymer selected from the group consisting of urethane resin, epoxy resin, acrylic resin, polyvinyl acetal resin, and polyvinylalcohol resin, and
the polymer is contained in an amount of 50 mass % or more and 99 mass % or less.

12. The windshield according to claim 1, wherein
the antifog laminate is formed in a rectangular shape in a plan view, and
corner portions of the antifog laminate are rounded.

13. The windshield according to claim 12, wherein at least one corner portion of the corner portions of the antifog laminate has a smaller curvature of roundness than those of the other corner portions.

14. The windshield according to claim 1, wherein a lamination indication mark for indicating that the antifog laminate is layered is provided on the heat blocking layer at a position on an outer side in an in-plane direction of the information acquisition region.

15. The windshield according to claim 1, wherein the heat blocking layer is made of a material having a thermal conductivity of $5 \times 10^{-4}$ cal/cm·sec·° C. or less.

16. The windshield according to claim 1, wherein the antifog layer contains a surfactant.

17. The windshield according to claim 1, wherein the antifog laminate is formed to have a trapezoidal cross section in which a side located on the antifog layer side is shorter than a side located on the heat blocking layer side.

18. The windshield according to claim 17, wherein
an imaging device for taking images of an outside of a vehicle through the information acquisition region and a laser device for emitting and/or receiving a ray of light that serve as the information acquisition devices are lined up in a horizontal direction, and
in the trapezoidal shape seen in the antifog laminate, a leg located on a side on which the laser device is arranged is inclined at a larger angle than an angle at a leg located on a side on which the imaging device is arranged is inclined.

19. The windshield according to claim 1, wherein the heat blocking layer is constituted by a plurality of layers.

20. A method for manufacturing a windshield for an automobile on which an information acquisition device capable of acquiring information from an outside of a vehicle by emitting and/or receiving light can be arranged, the method comprising:
a first step of preparing a glass plate including an information acquisition region that is opposite to the information acquisition device and through which the light passes, the glass plate being provided with a blocking layer that blocks a field of vision from the outside of the vehicle and is provided with an opening arranged to correspond to the information acquisition region;
a second step of layering, to a surface on a vehicle interior side of the information acquisition region, an antifog laminate that includes a heat blocking layer and an antifog layer with antifog properties layered on one surface of the heat blocking layer, while the other surface of the heat blocking layer faces the surface on the vehicle interior side of the information acquisition region, wherein the antifog layer contains a water absorbent resin as a main component, and the water absorbent resin contains a water repellent group; and
a third step of arranging, around the opening of the blocking layer, a bracket to which a cover for mounting the information acquisition device on the windshield is attached and fixing the bracket such that at least a portion of the bracket is blocked by the blocking layer.

21. The method for manufacturing a windshield according to claim 20, wherein a planar size of the antifog laminate is larger than a planar size of the opening of the blocking layer.

22. The method for manufacturing a windshield according to claim 21, wherein
the bracket is formed in a frame shape, and
the planar size of the antifog laminate is smaller than an internal size of the bracket.

23. The method for manufacturing a windshield according to claim 20, wherein a planar size of the antifog laminate is smaller than a planar size of the opening of the blocking layer.

24. The method for manufacturing a windshield according to claim 20, wherein
a planar size of the opening of the blocking layer is larger than a planar size of the information acquisition region, and
a planar size of the antifog laminate is larger than the planar size of the information acquisition region and smaller than the planar size of the opening of the blocking layer.

25. The method for manufacturing a windshield according to claim 20, wherein, in the second step, the antifog laminate is layered on the surface on the vehicle interior side of the information acquisition region such that at least a portion of an edge of the antifog laminate comes into contact with an edge of the opening of the blocking layer.

26. The method for manufacturing a windshield according to claim 25, wherein
an imaging device for taking images of the outside of the vehicle through the information acquisition region and a laser device for emitting and/or receiving a ray of light that serve as the information acquisition devices are lined up in a horizontal direction, and
a portion where the edge of the opening of the blocking layer and the edge of the antifog laminate are in contact with each other is arranged on the imaging device side.

27. The method for manufacturing a windshield according to claim 20, wherein a total thickness of the heat blocking layer and the antifog layer of the antifog laminate is larger than a thickness of the blocking layer.

28. The method for manufacturing a windshield according to claim 27, wherein a thickness of the heat blocking layer of the antifog laminate is larger than the thickness of the blocking layer.

29. The method for manufacturing a windshield according to claim 20, wherein
the glass plate includes an outer glass plate arranged on a vehicle exterior side and an inner glass plate arranged on a vehicle interior side,
an interlayer containing heat-ray absorbing particles is arranged between the outer glass plate and the inner glass plate, and
the particles are not arranged in a region of the interlayer that overlaps the blocking layer and the opening in a plan view, and are arranged in the other region.

30. The method for manufacturing a windshield according to claim 20, wherein
the antifog layer contains, as the water absorbent resin, at least one type of polymer selected from the group consisting of urethane resin, epoxy resin, acrylic resin, polyvinyl acetal resin, and polyvinylalcohol resin, and
the polymer is contained in an amount of 50 mass % or more and 99 mass % or less.

31. The method for manufacturing a windshield according to claim 20, wherein
the antifog laminate is formed in a rectangular shape in a plan view, and
corner portions of the antifog laminate are rounded.

32. The method for manufacturing a windshield according to claim 31, wherein at least one corner portion of the corner portions of the antifog laminate has a smaller curvature of roundness than those of the other corner portions.

33. The method for manufacturing a windshield according to claim 20, wherein a lamination indication mark for indicating that the antifog laminate is layered is provided on the heat blocking layer at a position on an outer side in an in-plane direction of the information acquisition region.

34. The method for manufacturing a windshield according to claim 20, wherein the heat blocking layer is made of a material having a thermal conductivity of $5 \times 10^{-4}$ cal/cm·sec·°C. or less.

35. The method for manufacturing a windshield according to claim 20, wherein the antifog layer contains a surfactant.

36. The method for manufacturing a windshield according to claim 20, wherein the antifog laminate is formed to have a trapezoidal cross section in which a side located on the antifog layer side is shorter than a side located on the heat blocking layer side.

37. The method for manufacturing a windshield according to claim 36, wherein
an imaging device for taking images of an outside of a vehicle through the information acquisition region and a laser device for emitting and/or receiving a ray of light that serve as the information acquisition devices are lined up in a horizontal direction, and
in the trapezoidal shape seen in the antifog laminate, a leg located on a side on which the laser device is arranged is inclined at a larger angle than an angle at a leg located on a side on which the imaging device is arranged is inclined.

38. The method for manufacturing a windshield according to claim 20, wherein the heat blocking layer is constituted by a plurality of layers.

* * * * *